US010156667B2

(12) United States Patent
Lee et al.

(10) Patent No.: US 10,156,667 B2
(45) **Date of Patent: *Dec. 18, 2018**

(54) POLARIZING PLATE AND IMAGE DISPLAY DEVICE COMPRISING SAME

(71) Applicant: LG CHEM, LTD., Seoul (KR)

(72) Inventors: Mi Rin Lee, Daejeon (KR); Kwang Seung Park, Daejeon (KR); Jun Wuk Park, Daejeon (KR); Eun Soo Huh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 288 days.

This patent is subject to a terminal disclaimer.

(21) Appl. No.: 15/025,171

(22) PCT Filed: Sep. 19, 2014

(86) PCT No.: PCT/KR2014/008730

§ 371 (c)(1),
(2) Date: Mar. 25, 2016

(87) PCT Pub. No.: WO2015/046816

PCT Pub. Date: Apr. 2, 2015

(65) Prior Publication Data

US 2016/0216423 A1 Jul. 28, 2016

(30) Foreign Application Priority Data

Sep. 30, 2013 (KR) ........................ 10-2013-0116989
Sep. 16, 2014 (KR) ........................ 10-2014-0122425

(51) Int. Cl.
*G02B 5/30* (2006.01)

(52) U.S. Cl.
CPC .................................... *G02B 5/305* (2013.01)

(58) Field of Classification Search
CPC ...... G02B 5/30; G02B 5/3025; G02B 5/3033; G02B 5/3041; G02B 5/305; G02B 1/10; G02B 1/105; G02B 1/14
See application file for complete search history.

(56) References Cited

U.S. PATENT DOCUMENTS

| | | | | |
|---|---|---|---|---|
| 5,234,972 | A * | 8/1993 | Saitoh | C07C 69/593 523/118 |
| 9,442,223 | B2 * | 9/2016 | Park | G02B 1/14 |
| 9,500,779 | B2 * | 11/2016 | Park | G02B 5/3025 |
| 9,611,411 | B2 * | 4/2017 | Park | C09J 133/14 |
| 2011/0043733 | A1 | 2/2011 | Suzuki et al. | |
| 2012/0320317 | A1 | 12/2012 | Yoon et al. | |
| 2014/0240647 | A1 | 8/2014 | Huh et al. | |
| 2015/0099127 | A1 * | 4/2015 | Ogawa | C09J 4/00 428/414 |
| 2016/0083491 | A1 * | 3/2016 | Yao | C08F 2/48 15/104.002 |
| 2016/0244645 | A1 * | 8/2016 | Lee | C09J 133/14 |

FOREIGN PATENT DOCUMENTS

| | | | |
|---|---|---|---|
| JP | 2009-008860 | A | 1/2009 |
| JP | 2009-211057 | | 9/2009 |
| JP | 2010-009027 | A | 1/2010 |
| JP | 2010-107951 | A | 5/2010 |
| JP | 2010-282161 | A | 12/2010 |
| JP | 2011-028245 | | 2/2011 |
| JP | 2013-181096 | A | 9/2013 |
| JP | 2014-115542 | A | 6/2014 |
| KR | 10-2010-0037553 | A | 4/2010 |
| KR | 10-2013-0020617 | A | 2/2013 |
| KR | 10-2014-0147939 | A | 12/2014 |
| TW | 201200917 | A1 | 1/2012 |
| WO | 2013/081101 | A1 | 6/2013 |

* cited by examiner

*Primary Examiner* — Stephone B Allen
*Assistant Examiner* — Adam W Booher
(74) *Attorney, Agent, or Firm* — Dentons US LLP

(57) ABSTRACT

The present invention relates to a polarizing plate including a polarizer, and a protective layer formed on at least one surface of the polarizer, in which the protective layer is a cured product of (A) a first compound represented by the following [Formula 1]; (B) a radical curable second compound including at least one carboxyl group conjugated to an unsaturated double bond between carbons present at a side chain in a molecule thereof; and (C) a radical curable composition including a radical initiator, and a liquid crystal display device including the same.

14 Claims, No Drawings

POLARIZING PLATE AND IMAGE DISPLAY DEVICE COMPRISING SAME

CROSS-REFERENCE TO RELATED APPLICATION(S)

This application is a National Stage Application of International Application No. PCT/KR2014/008730, filed Sep. 19, 2014, and claims the benefit of Korean Patent Application No. 10-2014-0122425, filed Sep. 16, 2014, and Korean Patent Application No. 10-2013-0116989, filed Sep. 30, 2013, the contents of which are incorporated herein by reference in their entirety for all purposes as if fully set forth below.

TECHNICAL FIELD

The present invention relates to a radical curable composition and a polarizing plate including the same, and more specifically, to a radical curable composition which has excellent adhesion between a polarizer and a protective layer, maintains excellent adhesion even under a high humidity environment, and is excellent in heat resistance, and a polarizing plate including the same.

BACKGROUND ART

A polarizing plate has been usually used in a structure, in which a protective film is stacked on both surfaces of a polarizer formed of a polyvinyl alcohol (hereinafter, referred to as 'PVA')-based resin dyed with a dichroic dye or iodine. This is because there is a problem in that when the protective film does not exist, durability and optical properties of the polarizer significantly deteriorate due to the vulnerable dimensional stability, and water resistance thereof also becomes notably vulnerable. In this case, a triacetyl cellulose (TAC)-based film has been frequently used as the protective film because the film is excellent in optical transparency or moisture permeability.

Meanwhile, as a liquid crystal display device has recently been developed into a mobile device such as a laptop personal computer, a cellular phone and a car navigation system, it is required that a polarizing plate which constitutes a liquid crystal display device is thin and lightweight. However, in a polarizing plate in which a TAC film and the like are laminated as the protective film as described above, it is difficult to maintain a thickness of the protective film at 20 μm or less from the viewpoint of handling property or durability performance during the operation, so that there is a limitation for the liquid crystal device to be thin and lightweight.

In order to solve the aforementioned problems, a technology has been suggested, in which a transparent thin film layer is formed by forming a protective film on only one surface of a polarizer, and coating an active energy ray curable composition on the other surface thereof. Meanwhile, the active energy ray curable composition which has been suggested may be classified into a radical curable composition and a cation curable composition according to the curing method. In this case, when a transparent thin film layer is formed using a cation curable composition, the transparent thin film layer is advantageous in that excellent adhesion with the polarizer is achieved, but disadvantageous in that a curling problem of a polarizing plate generated from a slow curing rate, a low degree of curing, a dark reaction and the like occur.

In order to solve such problems, a technology has been suggested, in which a transparent thin film layer is formed by using a radical curable composition which includes an acrylic or acrylamide-based compound as a main component, but in this case, there is a problem in that a polarizing plate, which is manufactured by using the composition, does not have good heat resistance because adhesion deteriorates under a high humidity environment, and a transparent thin film layer to be formed has a low glass transition temperature.

Therefore, there is a need for a new polarizing plate, which is excellent in adhesion between a polarizer and a protective layer, maintains adhesion at a good level even under a high humidity environment, and is excellent in heat resistance while having a thin protective layer which may be formed by curing radicals.

DISCLOSURE

Technical Problem

The present invention has been made in an effort to solve the aforementioned problem and provide a polarizing plate, which is excellent in adhesion between a polarizer and a protective layer, maintains adhesion at a good level even under a high humidity environment, is excellent in heat resistance, and may be manufactured into a thin-type, and an image display device including the same.

Technical Solution

In one aspect, the present invention provides a polarizing plate including a polarizer, and a protective layer formed on at least one surface of the polarizer, in which the protective layer is a cured product of (A) a first compound represented by the following [Formula I]; (B) a radical curable second compound including at least one carboxyl group conjugated to an unsaturated double bond between carbons present at a side chain in a molecule thereof; and (C) a radical curable composition including a radical initiator.

[Formula I]

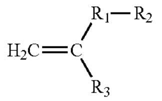

In [Formula I], $R_1$ is an ester group or an ether group; $R_2$ is a $C_{1\sim10}$ alkyl group, a $C_{4\sim10}$ cycloalkyl group, or a combination thereof, and in this case, $R_2$ has at least one hydroxy substituent in a molecule thereof; and $R_3$ is hydrogen, or a substituted or unsubstituted $C_{1\sim10}$ alkyl group.

Meanwhile, the second compound is preferably a compound represented by the following [Formula II].

[Formula II]

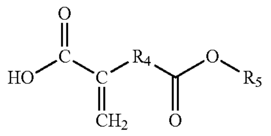

In [Formula II], $R_4$ is a single bond, a substituted or unsubstituted $C_{1\sim10}$ alkylene group, a substituted or unsubstituted $C_{4\sim14}$ cycloalkylene group, a substituted or unsubstituted $C_{6\sim14}$ arylene group, or a combination thereof; and $R_5$ is hydrogen; or a substituted or unsubstituted $C_{1\sim10}$ alkyl group, a substituted or unsubstituted $C_{4\sim14}$ cycloalkyl group, a substituted or unsubstituted $C_{6\sim14}$ aryl group, or a combination thereof.

Meanwhile, the radical curable composition preferably includes 40 to 90 parts by weight of the first compound, 1 to 50 parts by weight of the second compound and 0.5 to 10 parts by weight of the radical initiator, based on 100 parts by weight of the radical curable composition.

Meanwhile, the first compound may be one or more compounds selected from the group consisting of compounds represented by the following [Formula 1] to [Formula 8].

[Formula 1]

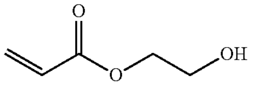

[Formula 2]

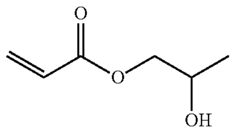

[Formula 3]

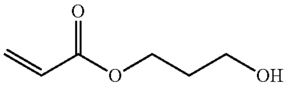

[Formula 4]

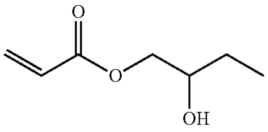

[Formula 5]

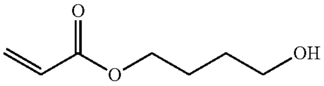

[Formula 6]

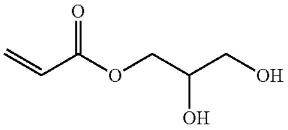

[Formula 7]

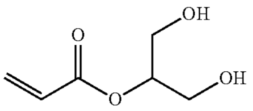

[Formula 8]

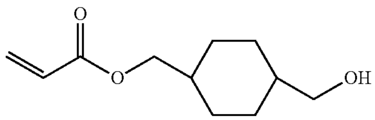

Meanwhile, the second compound may be one or more compounds selected from the group consisting of compounds represented by the following [Formula 9] to [Formula 13].

[Formula 9]

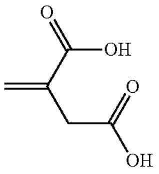

[Formula 10]

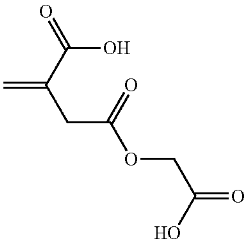

[Formula 11]

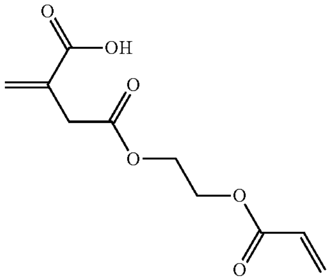

[Formula 12]

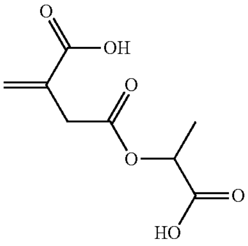

[Formula 13]

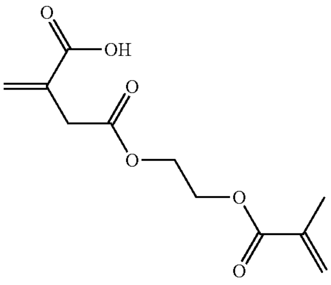

Meanwhile, the radical curable composition may further include a third compound having an acid value of 100 to 1,000 mg KOH/g.

In this case, the third compound may be one or more compounds selected from the group consisting of compounds represented by the following [Formula 14] to [Formula 25].

[Formula 14]
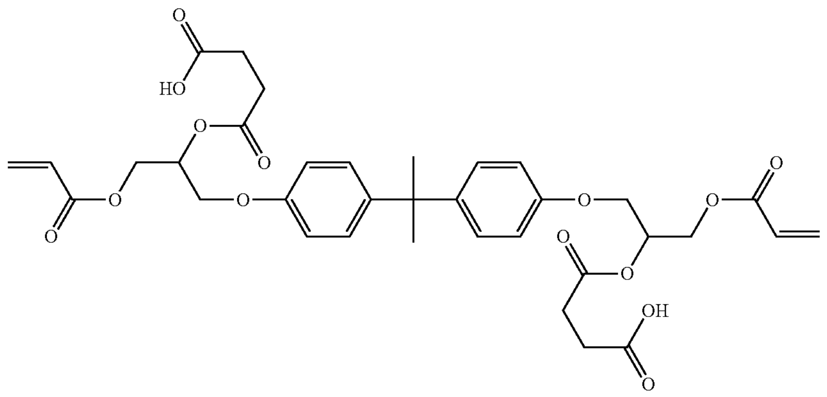
[Formula 15]
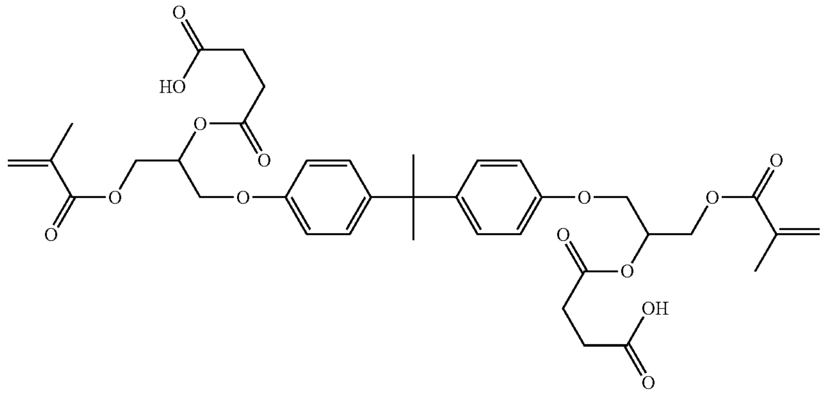
[Formula 16]
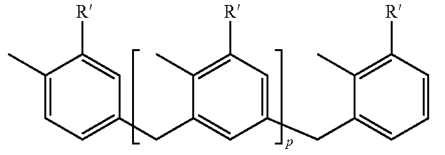
(Here, R' is
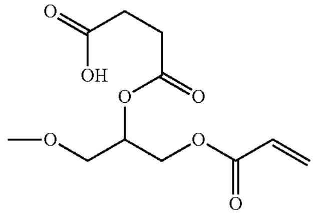
or
-continued
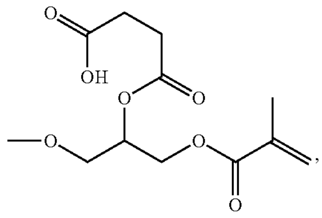
,
and p is an integer of 1 to 5)
[Formula 17]
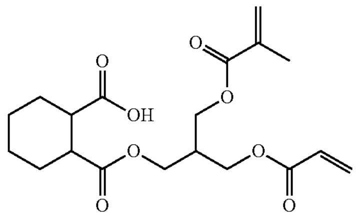
[Formula 18]
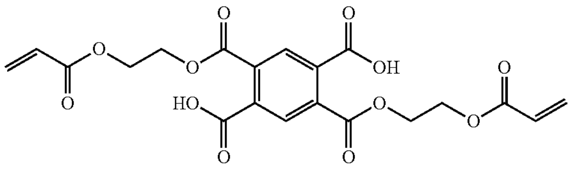

-continued

[Formula 19]

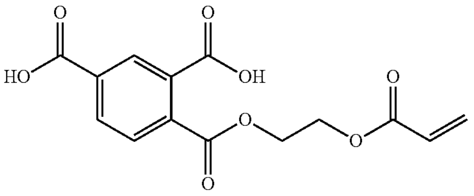

[Formula 20]

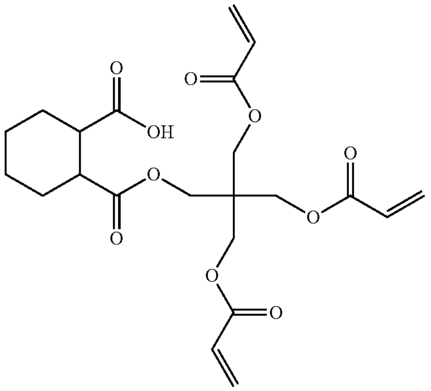

[Formula 21]

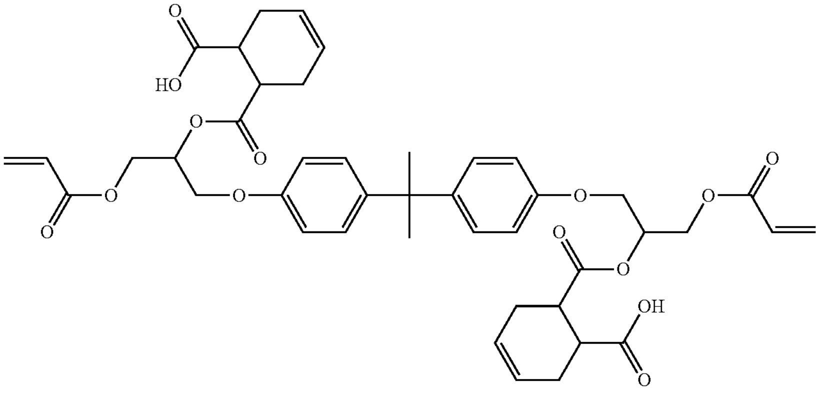

[Formula 22]

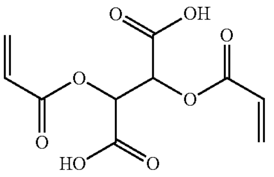

[Formula 23]

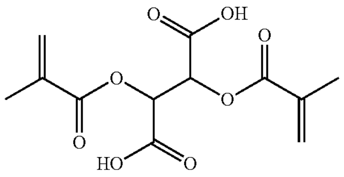

[Formula 24]

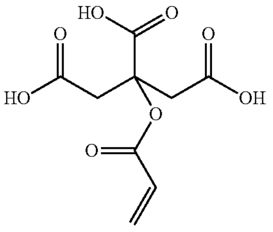

[Formula 25]

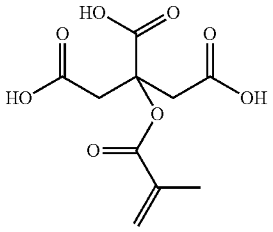

In this case, the content of the third compound is preferably 8 to 50 parts by weight based on 100 parts by weight of the radical curable composition.

Meanwhile, the radical curable composition preferably further includes a photoacid generator.

Meanwhile, the radical curable composition may be a composition further including a polyfunctional (meth) acrylic compound, a phosphate-based compound including at least one (meth)acrylic group in a molecule thereof, or a combination thereof.

Also, the radical curable composition may be a composition further including an epoxy compound including at least one epoxy group in a molecule thereof and a photoacid generator.

Meanwhile, the radical curable composition after the curing preferably has a glass transition temperature of 60° C. or more.

Meanwhile, the protective layer preferably has a thickness of 0.5 to 20 μm.

Meanwhile, in the polarizing plate of the present invention, a protective film may be further attached, through an adhesive layer, to a surface opposite to a surface of the polarizer, on which a protective layer is formed previously.

In addition, the polarizing plate of the present invention may further include an adhesion layer at the upper portion of the protective layer.

In another aspect, the present invention provides an image display device including the polarizing plate.

Advantageous Effects

The polarizing plate of the present invention is excellent in adhesion between a polarizer and a protective layer, and may maintain the adhesion at a good level even under a high humidity environment.

Furthermore, the polarizing plate of the present invention has a high glass transition temperature after the curing of the radical curable composition for forming a protective layer, and thus is thermally stable, and accordingly, a polarizing plate to be manufactured is excellent in heat resistance.

Further, the polarizing plate of the present invention has a protective layer having a small thickness as compared to a polarizing plate having a transparent protective film in the related art, and thus may be manufactured in a thin-type.

MODE FOR INVENTION

Hereinafter, preferred exemplary embodiments of the present invention will be described. However, the exemplary embodiments of the present invention may be modified in various forms, and the scope of the present invention is not limited to the exemplary embodiments which will be described below. Further, exemplary embodiments of the present invention are provided to more completely explain the present invention to a person with ordinary skill in the art.

1. Polarizing Plate

The present inventors have conducted repeated studies to develop a thin polarizing plate which may stably maintain adhesion between a polarizer and a protective layer even under a high humidity environment and is excellent in heat resistance, and as a result, have found that the object may be achieved when a radical curable compound including at least one carboxyl group conjugated to an unsaturated double bond between carbons present at a side chain in a molecule thereof is used in a mixture with an acrylic compound having a hydroxy group in a radical curable composition for forming a protective layer and the like, thereby completing the present invention.

More specifically, the polarizing plate of the present invention is a polarizing plate including a polarizer, and a protective layer formed on at least one surface of the polarizer, in which the protective layer includes (A) a first compound represented by the following [Formula 1]; (B) a radical curable second compound including at least one carboxyl group conjugated to an unsaturated double bond between carbons present at a side chain in a molecule thereof; and (C) a radical initiator.

[Formula I]

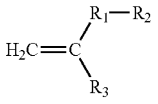

In [Formula I], $R_1$ is an ester group or an ether group; $R_2$ is a $C_{1\sim10}$ alkyl group, a $C_{4\sim10}$ cycloalkyl group, or a combination thereof, and in this case, $R_2$ has at least one hydroxy substituent in a molecule thereof; and $R_3$ is hydrogen, or a substituted or unsubstituted $C_{1\sim10}$ alkyl group.

1-1. Polarizer

First, as the polarizer of the present invention, it is possible to use a polarizer well known in the art, for example, a film composed of polyvinyl alcohol (PVA) including iodine or a dichroic dye. The polarizer may be manufactured by dyeing iodine or a dichromatic dye to the PVA film, but the manufacturing method thereof is not particularly limited. In the present specification, the polarizer refers to a state in which the polarizer does not include a protective layer (or a protective film), and the polarizing plate refers to a state in which the polarizing plate includes a polarizer and a protective layer (or a protective film).

Meanwhile, when the polarizer is a polyvinyl alcohol-based film, the polyvinyl alcohol-based film may be used without particular limitation as long as the film includes a polyvinyl alcohol resin or a derivative thereof. In this case, examples of the derivative of the polyvinyl alcohol resin include, but are not limited to, a polyvinyl formal resin, a polyvinyl acetal resin and the like. Also, as the polyvinyl alcohol-based film, it is also possible to use a commercially available polyvinyl alcohol-based film generally used in the manufacture of a polarizer in the art, for example, P30, PE30 and PE60 manufactured by Kuraray Co., Ltd., and M3000 and M6000 manufactured by Nippon Synthetic Chemical Industry Co., Ltd., and the like.

Meanwhile, the degree of polymerization of the polyvinyl alcohol-based film may be in a range of 1,000 to 10,000, preferably, in a range of 1,500 to 5,000, but is not limited thereto. This is because when the degree of polymerization satisfies the range, molecules of the polyvinyl alcohol-based film freely move, and may be flexibly mixed with iodine or a dichroic dye, and the like.

1-2. Protective Layer

Next, the protective layer of the present invention is formed by using the radical curable composition in order to support and protect a polarizer, and may be formed by a method well known in the art. For example, the protective layer may be formed by a method of applying the radical curable composition on one surface of a polarizer to form a protective layer by a coating method well known in the art, for example, a methods such as spin coating, bar coating, roll coating, gravure coating and blade coating, and then curing the protective layer through irradiation of an active energy ray. The method of irradiating an active energy ray is not particularly limited, and for example, may be performed by irradiating UV light at 10 to about 2,500 $mJ/cm^2$ using a UV light irradiation device (fusion lamp, D bulb).

In this case, the radical curable composition may more preferably include 40 to 90 parts by weight of the first compound, 1 to 50 parts by weight of the second compound and 0.1 to 10 parts by weight of the radical initiator, based on 100 parts by weight of the radical curable composition.

A. First Compound

First, the first compound included in the radical curable composition according to the present invention is a component for implementing adhesion between a polarizer and a protective layer using a hydrogen bond by a hydroxy group, and various compounds represented by [Formula 1] may be used.

[Formula I]

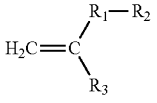

In [Formula I], $R_1$ is an ester group or an ether group; $R_2$ is a $C_{1\sim10}$ alkyl group, a $C_{4\sim10}$ cycloalkyl group, or a combination thereof, and in this case, $R_2$ has at least one hydroxy substituent in a molecule thereof; and $R_3$ is hydrogen, or a substituted or unsubstituted $C_{1\sim10}$ alkyl group.

In this case, in $R_2$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like.

Furthermore, in $R_2$, the cycloalkyl group refers to a non-aromatic monocyclic, bicyclic or tricyclic hydrocarbon moiety of 4 to 14, or 4 to 10, or 4 to 6 ring carbons, and the cycloalkyl group in the present specification may also include at least one unsaturated bond in a molecule thereof. Meanwhile, examples of the cycloalkyl group include, but are not limited to, a cyclopentane ring, a cyclohexane ring and the like.

Meanwhile, the hydroxy group may be substituted at any position in an alkyl group or a cycloalkyl group. For example, the hydroxy group may be present at a terminal of an alkyl group, or at the middle of an alkyl group. Meanwhile, the other hydrogen atoms included in the alkyl group or the cycloalkyl group may be substituted with any substituent.

Further, in $R_3$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like. One or more hydrogen atoms included in the alkyl group may be substituted with any substituent.

For example, in the present invention, the first compound may be, but is not limited to, one or more compounds selected from compounds represented by the following [Formula 1] to [Formula 8].

[Formula 1]

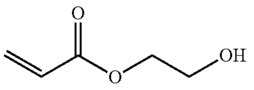

[Formula 2]

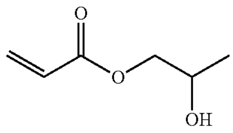

[Formula 3]

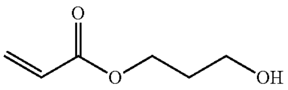

[Formula 4]

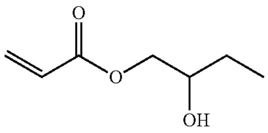

[Formula 5]

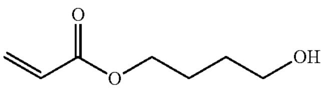

[Formula 6]

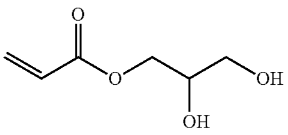

[Formula 7]

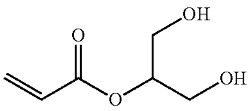

-continued

[Formula 8]

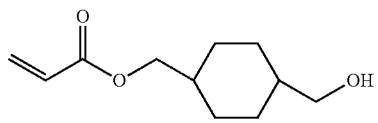

Meanwhile, the content of the first compound may be in a range of 40 to 90 parts by weight, preferably 50 to 80 parts by weight, and more preferably 60 to 80 parts by weight, based on 100 parts by weight of the entire radical curable composition. When the content of the first compound is too low, it is difficult to secure adhesion, and when the content thereof is too high, the glass transition temperature of the radical curable composition is decreased, thereby leading to deterioration in heat resistance.

B. Second Compound

Next, the second compound is a component for imparting moisture resistance to a radical curable composition, and furthermore increasing the glass transition temperature of the radical curable composition to further enhance heat resistance, and includes at least one carboxyl group in a molecule thereof, and at least one unsaturated double bond between carbons at a side chain, and various radical curable compounds in which the carboxyl group is conjugated to the unsaturated double bond between carbons may be used. In this case, the side chain refers to a hydrocarbon moiety branched from the main chain of the second compound.

In general, for the radical curable protective layer, adhesion is secured through a hydrogen bond between a hydroxy group of the protective layer and a hydroxy group of the polarizer, but there is a problem in that adhesion deteriorates because the hydroxy group of the polarizer forms a hydrogen bond with moisture instead of the hydroxy group of the protective layer under a high humidity environment. However, since a carboxyl group having a high affinity for moisture is bonded to moisture when the aforementioned second compound is together added thereto, a hydrogen bonding site with the polarizer may be secured, and accordingly, it is possible to prevent adhesion from deteriorating even under a high humidity environment. In addition, the radical may be excellently cured by a double bond between carbons present at the side chain.

Meanwhile, in the present invention, the second compound is not limited to, but is preferably a compound represented by the following [Formula II]. In this case, in particular, it is possible to secure excellent adhesion even under a high humidity environment, and furthermore, to further enhance heat resistance of the protective layer.

[Formula II]

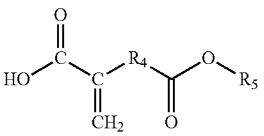

In [Formula II], $R_4$ is a single bond, a substituted or unsubstituted $C_{1\sim10}$ alkylene group, a substituted or unsubstituted $C_{4\sim14}$ cycloalkylene group, a substituted or unsubstituted $C_{6\sim14}$ arylene group, or a combination thereof; and $R_5$ is hydrogen; or a substituted or unsubstituted $C_{1\sim10}$ alkyl group, a substituted or unsubstituted $C_{4\sim14}$ cycloalkyl group, a substituted or unsubstituted $C_{6\sim14}$ aryl group, or a combination thereof.

In this case, in $R_4$, the alkylene group refers to a straight-chained or branch-chained divalent hydrocarbon moiety having 1 to 10, or 1 to 8, or 1 to 4 carbon atoms, and the alkylene group in the present specification may also include at least one unsaturated bond in a molecule thereof. Meanwhile, examples of the alkylene group include, but are not limited to, methylene, ethylene, trimethylene, tetramethylene, pentamethylene, hexamethylene, heptamethylene, nonamethylene, decamethylene and the like. One or more hydrogen atoms included in the alkylene group may be substituted with any substituent.

In addition, in $R_4$, the cycloalkylene group refers to a non-aromatic divalent monocyclic, bicyclic or tricyclic hydrocarbon moiety of 4 to 14, or 4 to 10, or 4 to 6 ring carbons, and the cycloalkylene group in the present specification may also include at least one unsaturated bond in a molecule thereof. Meanwhile, examples of the cycloalkylene group include, but are not limited to, a divalent cyclopentane ring, a divalent cyclohexane ring and the like. One or more hydrogen atoms included in the cycloalkylene group may be substituted with any substituent.

Furthermore, in $R_4$, the arylene group refers to a divalent monocyclic, bicyclic or tricyclic aromatic hydrocarbon moiety having 6 to 14, or 6 to 12 ring carbons, and examples thereof include, but are not limited to, a divalent benzene ring, a divalent naphthalene ring, a divalent anthracene ring, a biphenyl ring and the like. One or more hydrogen atoms included in the arylene group may be substituted with any substituent.

Meanwhile, $R_4$ is not limited thereto, but among them, is preferably a substituted or unsubstituted $C_{1\sim10}$ alkylene group, more preferably a substituted or unsubstituted $C_{1\sim8}$ alkylene group, and even more preferably a substituted or unsubstituted $C_{1\sim4}$ alkylene group.

Further, in $R_5$, the alkyl group refers to a straight-chained or branch-chained hydrocarbon moiety having 1 to 10, or 1 to 8, or 1 to 4 carbon atoms, and the alkyl group in the present specification may also include at least one unsaturated bond in a molecule thereof. Meanwhile, examples of the alkyl group include, but are not limited to, methyl, ethyl, propyl, butyl, pentyl, hexyl, heptyl, octyl, nonyl, decanyl and the like. One or more hydrogen atoms included in the alkyl group may be substituted with any substituent, and may be substituted with, for example, a carboxyl group, a (meth)acryloyl group or a (meth)acryloyloxy group.

In addition, in $R_5$, the cycloalkyl group refers to a non-aromatic monocyclic, bicyclic or tricyclic hydrocarbon moiety of 4 to 14, or 4 to 10, or 4 to 6 ring carbons, and the cycloalkyl group in the present specification may also include at least one unsaturated bond in a molecule thereof. Meanwhile, examples of the cycloalkyl group include, but are not limited to, a cyclopentane ring, a cyclohexane ring and the like. One or more hydrogen atoms included in the cycloalkyl group may be substituted with any substituent, and may be substituted with, for example, a carboxyl group, a (meth)acryloyl group or a (meth)acryloyloxy group.

Furthermore, in $R_5$, the aryl group refers to a divalent monocyclic, bicyclic or tricyclic aromatic hydrocarbon moiety having 6 to 14, or 6 to 12 ring carbons, and examples thereof include, but are not limited to, a benzene ring, a naphthalene ring, an anthracene ring, a biphenyl ring and the like. One or more hydrogen atoms included in the aryl group may be substituted with any substituent, and may be substituted with, for example, a carboxyl group, a (meth) acryloyl group or a (meth)acryloyloxy group.

Meanwhile, $R_5$ is not limited thereto, but is preferably hydrogen, or a substituted $C_{1\sim10}$ alkyl group, and in this case, the substituent is more preferably a carboxyl group, a (meth)acryloyl group, or a (meth)acryloyloxy group. Specifically, $R_5$ is more preferably hydrogen, a $C_{1\sim10}$ carboxyalkyl group, a $C_{1\sim10}$ (meth)acryloylalkyl group, or a $C_{1\sim10}$ (meth)acryloyloxyalkyl group. In this case, the $C_{1\sim10}$ carboxyalkyl group, the $C_{1\sim10}$ (meth)acryloylalkyl group, or the $C_{1\sim10}$ alkyl group of the $C_{1\sim10}$ (meth)acryloyloxyalkyl group may be a straight-chained or branch-chained hydrocarbon moiety having 1 to 10, 1 to 8, or 1 to 4 carbon atoms, as described above. Further, the carboxyl group of the $C_{1\sim10}$ carboxyalkyl group may be substituted at any position of the alkyl group, the (meth)acryloyl group of the $C_{1\sim10}$ (meth) acryloylalkyl group may also be substituted at any position of the alkyl group, and the (meth)acryloyloxy group of the $C_{1\sim10}$ (meth)acryloyloxyalkyl group may also be substituted at any position of the alkyl group.

More specifically, the second compound may be, but is not limited to, one or more compounds selected from the group consisting of compounds represented by the following [Formula 9] to [Formula 13].

[Formula 9]

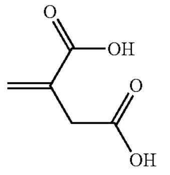

[Formula 10]

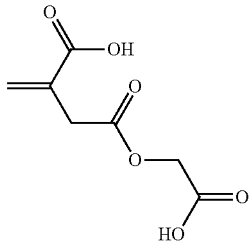

[Formula 11]

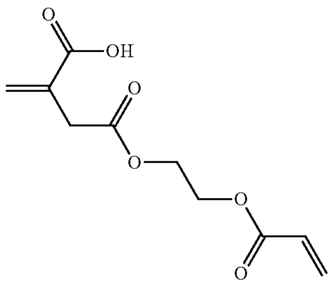

[Formula 12]

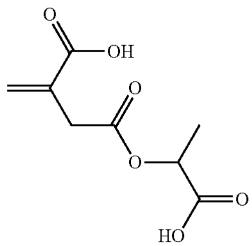

[Formula 13]

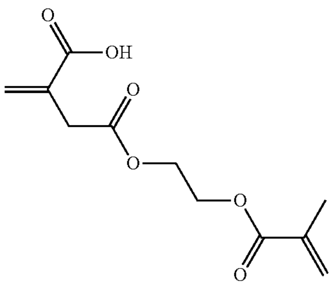

Meanwhile, the content of the second compound may be in a range of 1 to 50 parts by weight, preferably 1 to 40 parts by weight, and more preferably 5 to 35 parts by weight, based on 100 parts by weight of the entire radical curable composition. When the content of the second compound is too low, adhesion is not secured under a high humidity environment, and when the content thereof is too high, storage stability deteriorates, and adhesion may rather deteriorate due to the high glass transition temperature.

C. Radical Initiator

Next, the radical initiator included in the radical curable composition according to the present invention is for promoting the radical polymerizability to enhance the curing rate, and as the radical initiator, radical initiators generally used in the art may be used without limitation.

More specifically, the radical initiator may be, for example, one or more selected from the group consisting of 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoylformate, oxy-phenyl-acetic acid-2-[2 oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide, and phenylbis(2,4,6-trimethylbenzoyl)-phosphineoxide. Particularly in the present invention, phenylbis(2,4,6-trimethylbenzoyl)-phosphineoxide may be preferably used.

Meanwhile, the content of the radical initiator is preferably, for example, in a range of 0.5 to 10 parts by weight, 1 to 5 parts by weight, or 2 to 3 parts by weight, based on 100 parts by weight of the radical curable composition. This is because the radical curable composition may be smoothly cured when the content of the radical initiator satisfies the numerical range.

D. Third Compound

Meanwhile, the radical curable composition of the present invention may further include a third compound having an acid value of 100 to 1,000 mg KOH/g, if necessary. When the radical curable composition additionally includes the third compound having a high acid value as described above, the glass transition temperature of a protective layer may be further enhanced while adhesion of the protective layer does not deteriorate, and accordingly, much better heat resistance may be secured. Here, the acid value refers to the number of mg of KOH required to completely neutralize 1 g of a sample. Meanwhile, in the present specification, the third compound refers to a compound particularly except for the second compound among the compounds having an acid value of 100 to 1,000 mg KOH/g.

In this case, the third compound may be used without particular limitation as long as the third compound is a compound which is compatible with the radical curable composition of the present invention and has an acid value of 100 to 1,000 mg KOH/g, and more preferably, 100 to 900 mg KOH/g or 200 to 900 mg KOH/g, and may be, but is not limited to, for example, one or more compounds selected from the group consisting of compounds represented by the following [Formula 14] to [Formula 25].

[Formula 14]

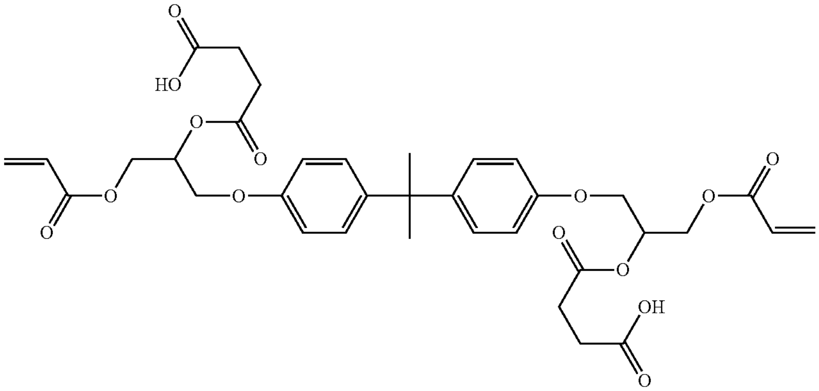

[Formula 15]

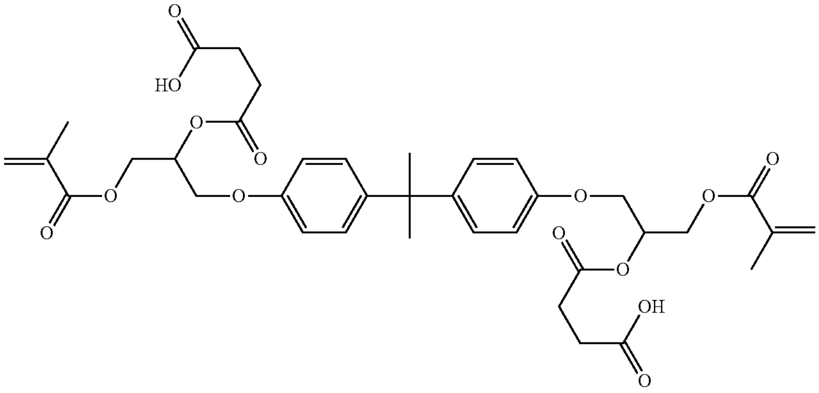

-continued
[Formula 16]
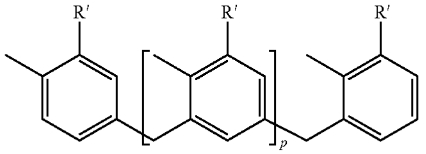
(Here, R' is
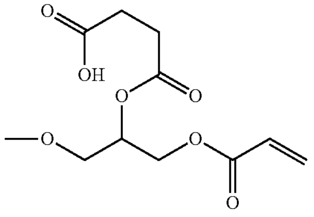
or
-continued
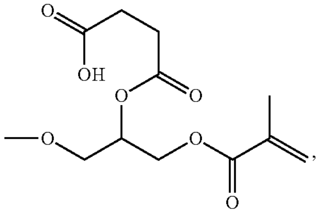
and p is an integer of 1 to 5)
[Formula 17]
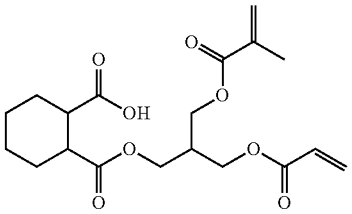
[Formula 18]
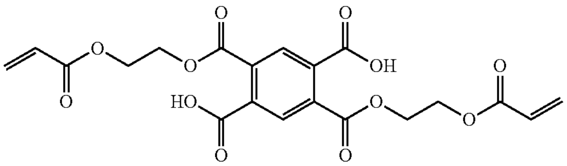
[Formula 19]
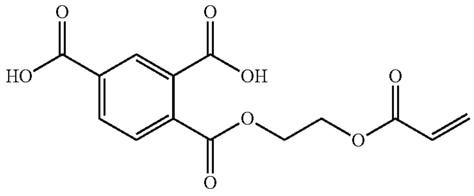
[Formula 20]
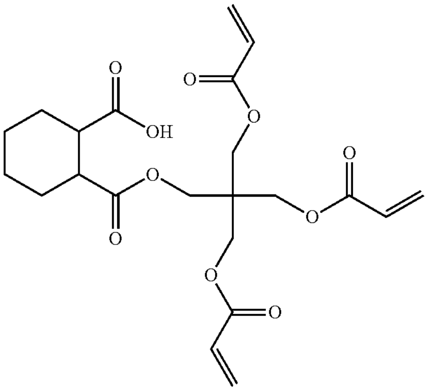
[Formula 21]
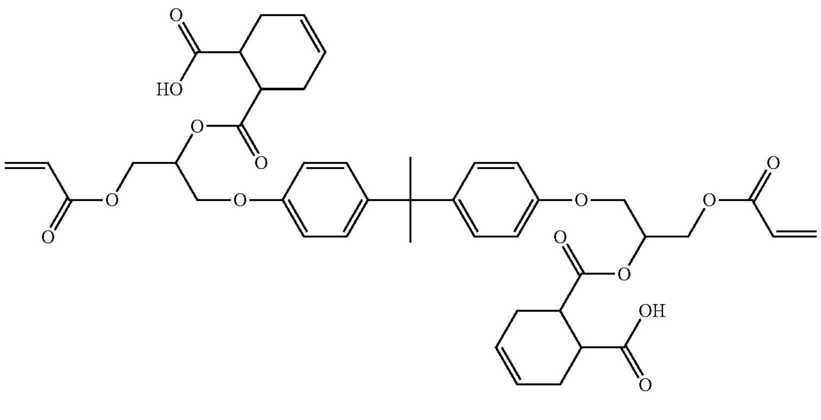

-continued

[Formula 22]

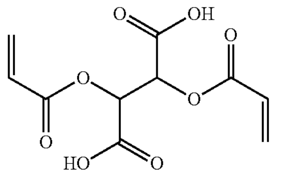

[Formula 23]

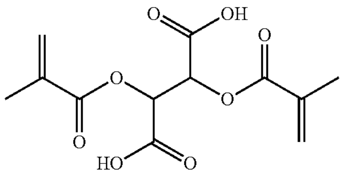

[Formula 24]

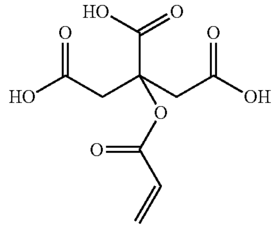

[Formula 25]

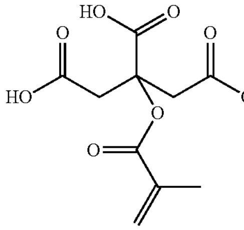

In this case, the content of the third compound may be in a range of 1 to 50 parts by weight, preferably 5 to 50 parts by weight, or 10 to 40 parts by weight, based on 100 parts by weight of the radical curable composition. When the content of the third compound satisfies the range, the glass transition temperature may be increased while adhesion does not deteriorate.

E. Photoacid Generator

Meanwhile, the radical curable composition of the present invention may additionally include a photoacid generator, if necessary. The photoacid generator is a compound which generates acid ($H^+$) by an active energy ray, and is advantageous in that when the photoacid generator is additionally included, the acid value of the radical curable composition may be adjusted by the photoacid generator, and accordingly, adhesion may be further enhanced.

The photoacid generator which may be used in the present invention is preferably a photoacid generator which includes, for example, a sulfonium salt or an iodonium salt. Specific examples of the photoacid generator including the sulfonium salt or the iodonium salt include, for example, one or more selected from the group consisting of diphenyl (4-phenylthio)phenylsulfonium hexafluoroantimonate, diphenyl (4-phenylthio)phenylsulfonium hexafluorophosphate, (phenyl) [4-(2-methylpropyl)phenyl]-iodonium hexafluorophosphate, (thiodi-4,1-phenylene)bis(diphenylsulfonium)dihexafluoroantimonate, and (thiodi-4,1-phenylene)bis(diphenylsulfonium)dihexafluorophosphate, but are not limited thereto.

Meanwhile, the content of the photoacid generator may be, for example, 10 parts by weight or less, preferably 0.1 to 10 parts by weight, 1 to 6 parts by weight, or 3 to 5 parts by weight, based on 100 parts by weight of the radical curable composition. When the photoacid generator is included in a content in the numerical range in the radical curable composition according to the present invention, there is an advantage in that adhesion is further enhanced than the case where the photoacid generator is not included or does not satisfy the numerical range.

F. Additional Composition 1 for Improving Water Resistance

Meanwhile, the radical curable composition of the present invention may additionally include a polyfunctional (meth) acrylic compound and/or a phosphate-based compound including at least one (meth)acrylic group in a molecule thereof, in order to increase the degree of crosslinking in the protective layer to improve water resistance, thereby exhibiting stable physical properties even under a high humidity environment.

For example, the radical curable composition of the present invention may be a composition including: the first compound; the second compound; a polyfunctional (meth) acrylic compound and/or a phosphate-based compound including at least one (meth)acrylic group in a molecule thereof; and a radical initiator.

Also, the radical curable composition of the present invention may be a composition including: the first compound; the second compound; the third compound; a polyfunctional (meth)acrylic compound and/or a phosphate-based compound including at least one (meth)acrylic group in a molecule thereof; and a radical initiator.

In this case, as the polyfunctional (meth)acrylic compound, various polyfunctional (meth)acrylic compounds well known in the art may be used without particular limitation. However, in the present specification, except for the following polyfunctional (meth)acrylic compounds enumerated as an example, a compound corresponding to the above-described first to third compounds and a phosphate-based compound to be described below will be excluded from the polyfunctional (meth)acrylic compounds.

In the present invention, examples of the polyfunctional (meth)acrylic compound include ethylene glycol di(meth) acrylate, 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth) acrylate, trimethylol propane di(meth)acrylate, pentaerythritol di(meth)acrylate, ditrimethylol propane di(meth) acrylate, diethylene glycol di(meth)acrylate, triethylene glycol di(meth)acrylate, dipropylene glycol di(meth)acrylate, tripropylene glycol di(meth)acrylate, polyethylene glycol di(meth)acrylate, polypropylene glycol di(meth)acrylate, polytetramethylene glycol di(meth)acrylate, silicone di(meth)acrylate, hydroxypivalic acid ester neopentyl glycol di(meth)acrylate, 2,2-bis[4-(meth)acryloyloxyethoxyethoxyphenyl]propane, 2,2-bis[4-(meth)acryloyloxyethoxyethoxycyclohexyl]propane, hydrogenated dicyclopentadienyl di(meth)acrylate, tricyclodecane dimethaneol di(meth) acrylate, 1,3-dioxane-2,5-diyl di(meth)acrylate, di(meth) acrylate of 2-(2-hydroxy-1,1-dimethylethyl)-5-ethyl-5-hydroxymethyl-1,3-dioxane, tris(hydroxyethyl)isocyanurate di(meth)acrylate, glycerin tri(meth)acrylate, trimethylolpropane tri(meth)acrylate, di trimethyolpropane tri(meth)acrylate, di trimethylol propane tetra(meth)acrylate, pentaerythritol tri(meth)acrylate, pentaerythritol tetra(meth)acrylate, di pentaerythritol tetra(meth)acrylate, di pentaerythritol penta (meth)acrylate, di pentaerythritol hexa (meth)acrylate and the like. These compounds may be used either alone or in a mixture.

Meanwhile, the polyfunctional (meth)acrylic compound is more preferably one or more selected from the group consisting of compounds represented by the following [Formula III] to [Formula V], but is not limited thereto. This is because water resistance improvement effects are further excellent in this case.

[Formula III]

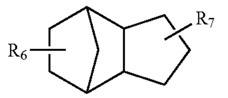

In [Formula III], $R_6$ and $R_7$ are each independently a (meth)acryloyloxy group or a (meth)acryloyloxy alkyl group.

In this case, in $R_6$ and $R_7$, the alkyl of the (meth) acryloyloxy alkyl group refers to a straight-chained or branch-chained hydrocarbon moiety having 1 to 10, or 1 to 8, or 1 to 4 carbon atoms, and the (meth)acryloyloxy group may be substituted at any position of the alkyl group. One or more hydrogen atoms included in the alkyl may be substituted with any substituent.

[Formula IV]

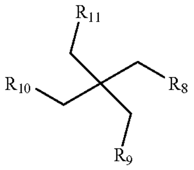

In [Formula IV], $R_8$, $R_9$ and $R_{10}$ are each independently a (meth)acryloyloxy group, or a (meth)acryloyloxy alkyl group, and $R_{11}$ is a (meth)acryloyloxy group, a (meth) acryloyloxy alkyl group, a hydroxy group, or a substituted or unsubstituted $C_{1\sim10}$ alkyl group.

In this case, in $R_8$, $R_9$, $R_{10}$ and $R_{11}$, the alkyl of the (meth)acryloyloxy alkyl group refers to a straight-chained or branch-chained hydrocarbon moiety having 1 to 10, or 1 to 8, or 1 to 4 carbon atoms, and the (meth)acryloyloxy group may be substituted at any position of the alkyl group. One or more hydrogen atoms included in the alkyl may be substituted with any substituent.

In addition, in $R_{11}$, the alkyl group refers to a straight-chained or branch-chained hydrocarbon moiety having 1 to 10, or 1 to 8, or 1 to 4 carbon atoms, and one or more hydrogen atoms included in the alkyl group may be substituted with any substituent.

[Formula V]

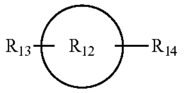

In [Formula V], $R_{12}$ is a substituted or unsubstituted $C_{1\sim10}$ alkylene, and $R_{13}$ and $R_{14}$ are each independently a (meth) acryloyloxy group or a (meth)acryloyloxy alkyl group.

In this case, in $R_{12}$, the alkylene refers to a straight-chained or branch-chained divalent hydrocarbon moiety having 1 to 10, or 1 to 8, or 1 to 6 carbon atoms, and the alkylene group in the present specification may also include at least one unsaturated bond in a molecule thereof. Meanwhile, examples of the alkylene group include, but are not limited to, methylene, ethylene, trimethylene, tetramethylene, pentamethylene, hexamethylene, heptamethylene, nonamethylene, decamethylene and the like. One or more hydrogen atoms included in the alkylene may be substituted with any substituent.

Furthermore, in $R_{13}$ and $R_{14}$, the alkyl of the (meth) acryloyloxy alkyl group refers to a straight-chained or branch-chained hydrocarbon moiety having 1 to 10, or 1 to 8, or 1 to 4 carbon atoms, and the (meth)acryloyloxy group may be substituted at any position of the alkyl group. One or more hydrogen atoms included in the alkyl may be substituted with any substituent.

More specifically, the polyfunctional (meth)acrylic compound may be, but is not limited to, one or more compounds selected from the group consisting of compounds represented by the following [Formula 26] to [Formula 29].

[Formula 26]

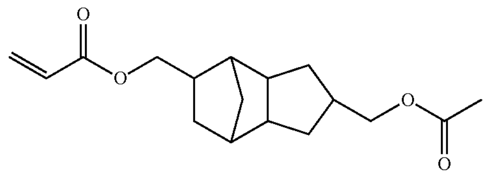

[Formula 27]

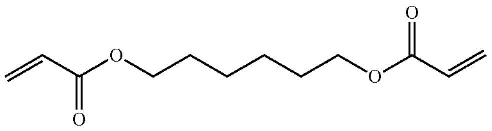

[Formula 28]

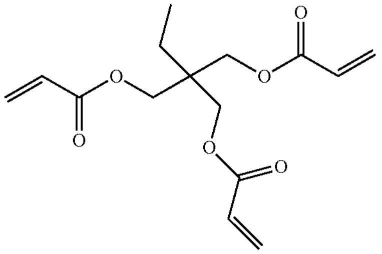

[Formula 29]

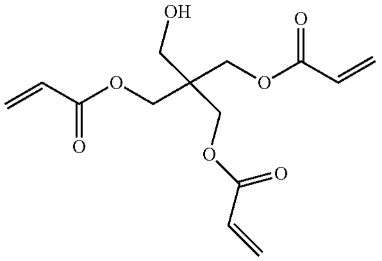

Further, the phosphate-based compound including at least one (meth)acrylic group in a molecule thereof may be used without particular limitation as long as the compound is a phosphate-based compound including at least one (meth) acrylic group in a molecule thereof. For example, the phosphate-based compound including at least one (meth)

acrylic group in a molecule thereof may be, but is not limited to, a compound represented by the following

[Formula VI]

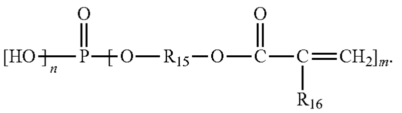

In [Formula VI], $R_{15}$ is a substituted or unsubstituted $C_{1\sim10}$ alkylene group, a substituted or unsubstituted $C_{4\sim14}$ cycloalkylene group, a substituted or unsubstituted $C_{6\sim14}$ arylene group, or a combination thereof; $R_{16}$ is hydrogen or a methyl group; and n is an integer of 0 to 2, m is an integer of 1 to 3, and n+m=3.

In this case, in $R_{15}$, the alkylene group refers to a straight-chained or branch-chained divalent hydrocarbon moiety having 1 to 10, or 1 to 8, or 1 to 4 carbon atoms, and the alkylene group in the present specification may also include at least one unsaturated bond in a molecule thereof. Meanwhile, examples of the alkylene group include, but are not limited to, methylene, ethylene, trimethylene, tetramethylene, pentamethylene, hexamethylene, heptamethylene, nonamethylene, decamethylene and the like. One or more hydrogen atoms included in the alkylene group may be substituted with any substituent.

In addition, in $R_{15}$, the cycloalkylene group refers to a non-aromatic divalent monocyclic, bicyclic or tricyclic hydrocarbon moiety of 4 to 14, or 4 to 10, or 4 to 6 ring carbons, and the alkylene group in the present specification may also include at least one unsaturated bond in a molecule thereof. Meanwhile, examples of the cycloalkylene group include, but are not limited to, a divalent cyclopentane ring, a divalent cyclohexane ring and the like. One or more hydrogen atoms included in the cycloalkylene group may be substituted with any substituent.

Furthermore, in $R_{15}$, the arylene group refers to a divalent monocyclic, bicyclic or tricyclic aromatic hydrocarbon moiety having 6 to 14, or 6 to 12 ring carbons, and examples thereof include, but are not limited to, a divalent benzene ring, a divalent naphthalene ring, a divalent anthracene ring, a divalent biphenyl ring and the like. One or more hydrogen atoms included in the arylene group may be substituted with any substituent.

Meanwhile, $R_{15}$ is not limited thereto, but among them, is preferably a substituted or unsubstituted $C_{1\sim10}$ alkylene group, more preferably a substituted or unsubstituted $C_{1\sim8}$ alkylene group, and even more preferably a substituted or unsubstituted $C_{1\sim4}$ alkylene group.

Further, it is preferred that in n and m, n is an integer of 1 and 2, m is an integer of 1 and 2, and n+m=3, and it is particularly preferred that n is 2, m is 1, and n+m=3.

More specifically, the phosphate-based compound including at least one (meth)acrylic group in a molecule thereof may be, but is not limited to, one or more compounds selected from the group consisting of compounds represented by the following [Formula 30] to [Formula 35].

[Formula 30]

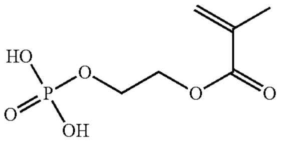

-continued

[Formula 31]

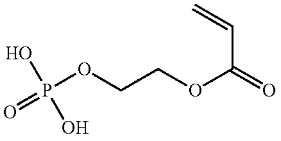

[Formula 32]

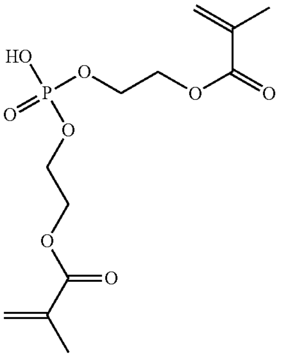

[Formula 33]

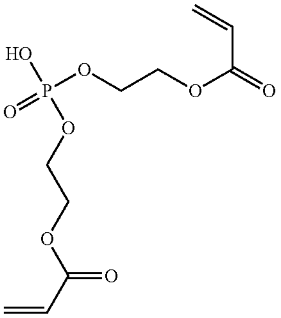

[Formula 34]

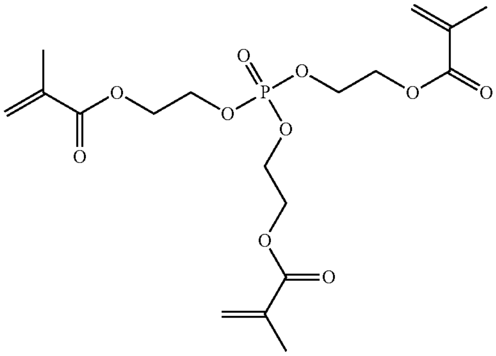

[Formula 35]

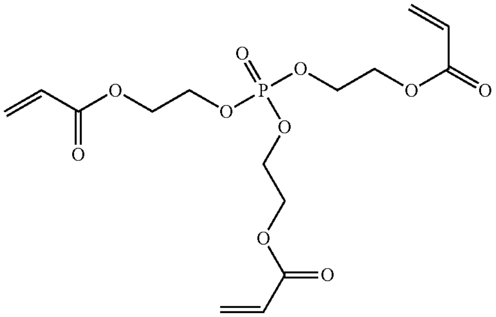

Meanwhile, the content of the polyfunctional (meth) acrylic compound may be in a range of 4 to 50 parts by weight, preferably 5 to 40 parts by weight, and more preferably 10 to 40 parts by weight, based on 100 parts by weight of the entire radical curable composition. When the compound satisfies the content range, the radical curable composition of the present invention may secure excellent adhesion and water resistance.

In addition, the content of the phosphate-based compound including at least one (meth)acrylic group in a molecule thereof may be in a range of 0.5 to 30 parts by weight, preferably 0.5 to 20 parts by weight, and more preferably 0.5 to 15 parts by weight, based on 100 parts by weight of the entire radical curable composition. When the compound satisfies the content range, the radical curable composition of the present invention may secure excellent adhesion and water resistance.

G. Additional Composition 2 for Improving Water Resistance

Meanwhile, the radical curable composition of the present invention may be a composition including an epoxy compound, which additionally includes at least one epoxy group in a molecule thereof, and a photoacid generator, in order to improve water resistance to exhibit stable physical properties even under a high humidity environment. In this case, the photoacid generator is the same as that as described above.

For example, the radical curable composition of the present invention may be a composition including: the first compound; the second compound; an epoxy compound including at least one epoxy group in a molecule thereof; a radical initiator; and a photoacid generator.

Furthermore, the radical curable composition of the present invention may be a composition including: the first compound; the second compound; the third compound; an epoxy compound including at least one epoxy group in a molecule thereof; a radical initiator; and a photoacid generator.

In this case, the epoxy compound including at least one epoxy group in a molecule thereof is not particularly limited as long as the compound includes at least one epoxy group in a molecule thereof, and examples thereof include an aromatic epoxy-based compound, a hydrogenated epoxy-based compound, an alicyclic epoxy-based compound, an epoxy group-containing (meth)acrylic compound and the like. These compounds may be used either alone or in a mixture of two or more thereof.

In this case, the aromatic epoxy-based compound refers to an epoxy-based compound including at least one aromatic hydrocarbon ring in a molecule thereof, and examples thereof include, but are not limited to, a bisphenol-type epoxy resin such as diglycidyl ether of bisphenol A, diglycidyl ether of bisphenol F, and diglycidyl ether of bisphenol S; a novolac-type epoxy resin such as a phenol novolac epoxy resin, a cresol novolac epoxy resin, and a hydroxybenzaldehyde phenol novolac epoxy resin; a polyfunctional epoxy resin such as a glycidyl ether of tetrahydroxy phenylmethane, a glycidyl ether of tetrahydroxy benzophenone, and epoxidized polyvinylphenol, and the like.

Further, the hydrogenated epoxy-based compound refers to an epoxy-based compound obtained by selectively subjecting the aromatic epoxy-based compound to a hydrogenation reaction under pressure in the presence of a catalyst.

In addition, the alicyclic epoxy-based compound refers to an epoxy-based compound in which an epoxy group is formed between two adjacent carbon atoms which constitute an aliphatic hydrocarbon ring, and examples thereof include, but are not limited to, 2-(3,4-epoxy)cyclohexyl-5,5-spiro-(3,4-epoxy)cyclohexane-m-dioxane, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, vinylcyclohexane dioxide, bis(3,4-epoxycyclohexylmethyl)adipate, bis(3,4-epoxy-6-methylcyclohexylmethyl)adipate, exo-exo bis(2,3-epoxycyclopentyl)ether, endo-exo bis(2,3-epoxycyclopentyl)ether, 2,2-bis[4-(2,3-epoxypropoxy)cyclohexyl]propane, 2,6-bis(2,3-epoxypropoxycyclohexyl-p-dioxane), 2,6-bis(2,3-epoxypropoxy)norbornene, limonene dioxide, 2,2-bis(3,4-epoxycyclohexyl)propane, dicyclopentadiene dioxide, 1,2-epoxy-6-(2,3-epoxypropoxy)hexahydro-4,7-methanoindane, p-(2,3-epoxy)cyclopentyl phenyl-2,3-epoxypropyl ether, 1-(2,3-epoxypropoxy)phenyl-5,6-epoxyhexahydro-4,7-methanoindane, o-(2,3-epoxy)cyclopentyl phenyl-2,3-epoxypropyl ether), 1,2-bis[5-(1,2-epoxy)-4,7-hexahydro methanoindanoxyl]ethane cyclopentyl phenyl glycidyl ether, methylenebis(3,4-epoxycyclohexane)ethylene glycol di(3,4-epoxycyclohexylmethyl)ether, ethylenebis(3,4-epoxycyclohexanecarboxylate) and the like.

In addition, the epoxy group-containing (meth)acrylic compound refers to a compound including both an epoxy group and a (meth)acryloyloxy group in a molecule thereof, and examples thereof include, but are not limited to, glycidyl acrylate, 2-methyl glycidyl acrylate, 3,4-epoxy butyl acrylate, 6,7-epoxy heptyl acrylate, 3,4-epoxycyclohexyl acrylate, glycidyl methacrylate, 2-methylglycidyl methacrylate, 3,4-epoxy butyl methacrylate, 6,7-epoxy heptyl methacrylate, 3,4-epoxycyclohexyl methacrylate, 4-hydroxybutyl acrylate glycidyl ether and the like.

Meanwhile, the epoxy compound including at least one epoxy group in a molecule thereof preferably includes one or more selected from the group consisting of an alicyclic epoxy-based compound and an epoxy group-containing (meth)acrylic compound. In this case, the alicyclic epoxy-based compound is particularly preferably an epoxy-based compound having at least two epoxy groups and at least two alicyclic rings in a molecule thereof among them, for example, 3,4-epoxycyclohexylmethyl-3,4-epoxycyclohexane carboxylate and the like, and the epoxy group-containing (meth)acrylic compound is particularly preferably a glycidyl (meth)acrylic compound, for example, glycidyl acrylate, glycidyl methacrylate and the like among them. In this case, an effect of improving water resistance of the radical curable composition of the present invention is very excellent.

Meanwhile, the content of the epoxy compound including at least one epoxy group in a molecule thereof may be in a range of 1 to 20 parts by weight, preferably 1 to 15 parts by weight, and more preferably 1 to 10 parts by weight, based on 100 parts by weight of the entire radical curable composition. When the compound satisfies the content range, the radical curable composition of the present invention may secure excellent adhesion and water resistance.

H. Physical Properties of Radical Curable Composition

Meanwhile, the radical curable composition according to the present invention preferably has a viscosity in a range of 10 to 200 cP or 20 to 100 cP. When the viscosity of the radical curable composition satisfies the numerical range, there is an advantage in that workability is excellent because the protective layer may be thinly formed, and has a low viscosity.

Furthermore, the glass transition temperature after the curing of the radical curable composition according to the present invention is preferably 60° C. or more, and may be, for example, 60 to 500° C. or 70 to 200° C. A protective layer manufactured by using the radical curable composition according to the present invention, which has a glass transition temperature in the aforementioned numerical range, is advantageous in that excellent heat resistance is achieved.

Meanwhile, the thickness of a protective layer formed by using the radical curable composition is preferably 0.5 to 20 μm, and may be, for example, 0.5 to 15 μm or 0.5 to 10 μm. This is because a polarizing plate manufactured may become thin and lightweight when the thickness of the protective layer satisfies the range. When the thickness is too small, thermal impact stability and curl characteristics of the polarizer are vulnerable, and when the thickness is too large, it is difficult to make the polarizing plate thin and lightweight.

1-3. Protective Film

Meanwhile, the polarizing plate of the present invention may further include a protective film on one surface of the polarizer, if necessary. More specifically, when the protective layer is formed on one surface of the polarizer in the polarizing plate of the present invention, a separate protective film may be attached, through an adhesive layer, to a surface opposite to the surface, on which a protective layer is formed previously, in order to support and protect the polarizer.

In this case, the protective film is provided for supporting and protecting a polarizer, and it is possible to use protective films formed of various materials generally known in the art, for example, a cellulose-based film, a polyethylene terephthalate (PET) film, a cycloolefin polymer (COP) film, an acrylic film and the like without limitation. Among them, it is particularly preferred that an acrylic film is used in consideration of optical properties, durability, economic efficiency and the like.

Meanwhile, the acrylic film which may be used in the present invention may be obtained by molding a molding material including a (meth)acrylate-based resin as a main component by extrusion molding. In this case, the (meth) acrylate-based resin includes a resin including a (meth) acrylate-based unit as a main component, and is a concept which includes not only a homopolymer resin composed of a (meth)acrylate-based unit but also a copolymer resin in which other monomer units other than the (meth)acrylate-based unit are copolymerized, and a blend resin in which other resins are blended with the aforementioned (meth) acrylate-based resin.

Meanwhile, the (meth)acrylate-based unit may be, for example, an alkyl(meth)acrylate-based unit. Here, the alkyl (meth)acrylate-based unit refers to both an alkyl acrylate-based unit and an alkyl methacrylate-based unit, and the alkyl group of the alkyl(meth)acrylate-based unit has preferably 1 to 10 carbon atoms, and more preferably 1 to 4 carbon atoms.

Further, examples of a monomer unit capable of being copolymerized with the (meth)acrylate-based unit include a styrene-based unit, a maleic anhydride-based unit, a maleimide-based unit and the like. In this case, examples of the styrene-based unit include, but are not limited to, styrene, α-methylstyrene and the like; examples of the maleic anhydride-based monomer include, but are not limited to, maleic anhydride, methyl maleic anhydride, cyclohexyl maleic anhydride, phenyl maleic anhydride, and the like; and examples of the maleimide-based monomer include, but are not limited to, maleimide, N-methyl maleimide, N-cyclohexyl maleimide, N-phenyl maleimide and the like. These may be used either alone or in a mixture.

Meanwhile, the acrylic film may be a film including a (meth)acrylate-based resin having a lactone ring structure. Specific examples of the (meth)acrylate-based resin having a lactone ring structure include (meth)acrylate-based resins having a lactone ring structure, which are described in, for example, the official gazettes of Japanese Patent Application Laid-Open Nos. 2000-230016, 2001-151814, and 2002-120326, and the like.

The method of manufacturing the acrylic film is not particularly limited, and for example, the acrylic film may be manufactured by sufficiently mixing a (meth)acrylate-based resin, other polymers, an additive and the like by any appropriate mixing method to manufacture a thermoplastic resin composition, and then film-molding the resin composition, or may also be manufactured by preparing the (meth) acrylate-based resin, other polymers, an additive and the like in separate solutions, mixing the solutions to form a homogeneous mixture solution, and then film-molding the mixture solution. In addition, the acrylic film may be an unstretched film, or a stretched film. The stretched film may be a uniaxially stretched film or a biaxially stretched film, and the biaxially stretched film may be a simultaneous biaxially stretched film or a sequential biaxially stretched film.

Meanwhile, the polarizing plate of the present invention may further include a primer layer between the adhesive layer and the protective film in order to further enhance adhesive strength. In this case, the primer layer may be formed by a method of applying a coating solution including a water-dispersible polymer resin, a water-dispersible particulate and water on a protective film by using a bar coating method, a gravure coating method and the like, and drying the coating solution. The water-dispersible polymer resin may be, for example, a water-dispersible polyurethane-based resin, a water-dispersible acrylic resin, a water-dispersible polyester-based resin or a combination thereof, and the like, and for the water-dispersible particulate, it is possible to use an inorganic-based particulate such as silica, titania, alumina and zirconia, or an organic-based particulate composed of a silicone-based resin, a fluorine-based resin, a (meth)acrylic resin, a crosslinked polyvinyl alcohol and a melamine-based resin, or a combination thereof, but the particulate is not limited thereto.

Meanwhile, the polarizer and the protective film may be attached by a method of applying an adhesive on the surface of the polarizer or the protective film by using a roll coater, a gravure coater, a bar coater, a knife coater, or a capillary coater, and the like, and then heating and paper-laminating the polarizer or the protective film by a laminated paper roll, or laminating paper by compressing the polarizer or the protective film at normal temperature, a method of irradiating UV after the paper-lamination, or the like. Meanwhile, as the adhesive, various adhesives for a polarizing plate used in the art, for example, a polyvinyl alcohol-based adhesive, a polyurethane-based adhesive, an acrylic adhesive, a cationic or radical adhesive and the like may be used without limitation.

1-4. Adhesion Layer

Meanwhile, the polarizing plate of the present invention may include an adhesion layer at the upper portion of the protective layer, if necessary, for attachment to an optical film such as a display device panel or a phase difference film.

In this case, the adhesion layer may be formed by using various gluing agents well known in the art, and the kind thereof is not particularly limited. For example, the adhesion layer may be formed by using a rubber-based gluing agent, an acrylic gluing agent, a silicone-based gluing agent, a urethane-based gluing agent, a polyvinyl alcohol-based gluing agent, a polyvinyl pyrrolidone-based gluing agent, a polyacryl amide-based gluing agent, a cellulose-based gluing agent, a vinyl alkyl ether-based gluing agent and the like.

Among them, it is particularly preferred that an acrylic film is used in consideration of transparency, heat resistance and the like.

Meanwhile, the adhesion layer may be formed by a method of applying a gluing agent at the upper portion of the protective layer, and may also be formed by a method of attaching an adhesion sheet, which is manufactured by applying a gluing agent on a release sheet, and then drying the gluing agent, at the upper portion of the protective layer.

2. Image Display Device

The aforementioned polarizing plate of the present invention may be usefully applied to an image display device such as a liquid crystal display device. The image display device may be, for example, a liquid crystal display device including a liquid crystal panel and polarizing plates each provided on both surfaces of the liquid crystal panel, and in this case, at least one of the polarizing plates may be the polarizing plate according to the present invention. In this case, the kind of the liquid crystal panel included in the liquid crystal display device is not particularly limited. For example, it is possible to apply all the publicly known panels such as a passive matrix type panel such as a twisted nematic (TN)-type, a super twisted nematic (STN)-type, a ferroelectric (F)-type, or a polymer dispersed (PD)-type; an active matrix type panel such as a two terminal or three terminal; an in plane switching (IPS) panel and a vertical alignment (VA) panel without being limited to the kind thereof. Furthermore, the kinds of other configurations which constitute the liquid crystal display device, for example, the kinds of upper and lower substrates (ex. a color filter substrate, or an array substrate) and the like are not particularly limited, and the configuration publicly known in the field may be adopted without limitation.

BEST MODE

Hereinafter, the present invention will be described in more detail with reference to specific Examples.

PREPARATION EXAMPLE 1—MANUFACTURE OF ACRYLIC PROTECTIVE FILM

A raw material pellet was manufactured by supplying a resin composition, in which poly(N-cyclohexylmaleimide-co-methylmethacrylate), a styrene-maleic anhydride copolymer resin and a phenoxy-based resin were uniformly mixed with each other at a weight ratio of 100:2.5:5, to a 24Φ extruder in which a portion from a raw material hopper to the extruder was substituted with nitrogen, and melting the mixed resin composition at 250° C.

PKFE (Mw=60,000, Mn=16,000, Tg=95° C.) manufactured by InChemRez® Co., Ltd., was used as the phenoxy-based resin, Dylaeck 332 with a content of 85 wt % of styrene and 15 wt % of anhydrous maleic anhydride was used as the styrene-maleic anhydride copolymer resin, and as the poly(N-cyclohexylmaleimide-co-methylmethacrylate) resin, a resin with a content of 6.5 wt % of N-cyclohexylmaleimide as a result of NMR analysis was used.

The obtained raw material pellet was dried under vacuum, melted by the extruder at 260° C., allowed to pass through a coat hanger-type T-die, and allowed to pass through a chrome plating casting roll and a drying roll and the like to manufacture a film having a thickness of 150 μm. A pilot stretching device was used to stretch the film at a ratio of 170% in the MD direction at 125° C. by using the difference between speeds of the rolls, thereby manufacturing an acrylic film.

After the acrylic film manufactured by the aforementioned process was subjected to corona treatment, a primer composition, in which 20 parts by weight of an oxazoline crosslinking agent (Nippon Shokubai Co., Ltd., WS700) was added to a primer composition with a solid content of 10 wt % that is prepared by diluting CK-PUD-F (Chokwang urethane dispersion) with pure water, was coated on one surface of the acrylic film with a #7 bar, and then the acrylic film was stretched at a ratio of 190% in a TD direction at 130° C. using a tenter, thereby finally manufacturing an acrylic protective film having a primer layer thickness of 400 nm.

PREPARATION EXAMPLE 2—PREPARATION OF RADICAL CURABLE COMPOSITION (1) Radical Curable Composition A Radical curable composition A was prepared by adding 3 parts by weight of a radical initiator phenylbis(2,4,6-trimethylbenzoyl)-phosphine oxide to 100 parts by weight of a radical curable composition including 70 parts by weight of 2-hydroxyethyl acrylate, 10 parts by weight of itaconic acid, and 20 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid).

(2) Radical Curable Composition B

Radical curable composition B was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 70 parts by weight of 2-hydroxyethyl acrylate, 10 parts by weight of itaconic acid, and 20 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid).

(3) Radical Curable Composition C

Radical curable composition C was prepared by adding 3 parts by weight of a radical initiator phenylbis(2,4,6-trimethylbenzoyl)-phosphine oxide to 100 parts by weight of a radical curable composition including 70 parts by weight of 2-hydroxyethyl acrylate, 20 parts by weight of itaconic acid, and 10 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid).

(4) Radical Curable Composition D

Radical curable composition D was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 70 parts by weight of 2-hydroxyethyl acrylate, 20 parts by weight of itaconic acid, and 10 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid).

(5) Radical Curable Composition E

Radical curable composition E was prepared by adding 3 parts by weight of a radical initiator phenylbis(2,4,6-trimethylbenzoyl)-phosphine oxide to 100 parts by weight of a radical curable composition including 68 parts by weight of 2-hydroxyethyl acrylate, 20 parts by weight of 4-(carboxymethoxy)-2-methylene-4-oxobutanoic acid, and 12 parts by weight of 4-(2-(acryloyloxy)ethoxy)-2-methylene-4-oxobutanoic acid.

(6) Radical Curable Composition F

Radical curable composition F was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 68 parts by weight of 2-hydroxyethyl acrylate, 20 parts by weight of 4-(carboxymethoxy)-2-methylene-4-oxobutanoic acid, and 12 parts by weight of 4-(2-(acryloyloxy)ethoxy)-2-methylene-4-oxobutanoic acid.

(7) Radical Curable Composition G

Radical curable composition G was prepared by adding 3 parts by weight of a radical initiator phenylbis(2,4,6-trimethylbenzoyl)-phosphine oxide to 100 parts by weight of a radical curable composition including 60 parts by weight of 2-hydroxyethyl acrylate, 25 parts by weight of 4-(carboxymethoxy)-2-methylene-4-oxobutanoic acid, and 15 parts by weight of 4-(2-(acryloyloxy)ethoxy)-2-methylene-4-oxobutanoic acid.

(8) Radical Curable Composition H

Radical curable composition H was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 60 parts by weight of 2-hydroxyethyl acrylate, 25 parts by weight of 4-(carboxymethoxy)-2-methylene-4-oxobutanoic acid, and 15 parts by weight of 4-(2-(acryloyloxy)ethoxy)-2-methylene-4-oxobutanoic acid.

(9) Radical Curable Composition I

Radical curable composition I was prepared by adding 3 parts by weight of a radical initiator phenylbis(2,4,6-trimethylbenzoyl)-phosphine oxide to 100 parts by weight of a radical curable composition including 70 parts by weight of 2-hydroxypropyl acrylate, 10 parts by weight of itaconic acid, and 20 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid).

(10) Radical Curable Composition J

Radical curable composition J was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 70 parts by weight of 2-hydroxypropyl acrylate, 10 parts by weight of itaconic acid, and 20 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid).

(11) Radical Curable Composition K

Radical curable composition K was prepared by adding 3 parts by weight of a radical initiator phenylbis(2,4,6-trimethylbenzoyl)-phosphine oxide to 100 parts by weight of a radical curable composition including 60 parts by weight of 4-hydroxybutyl acrylate, 10 parts by weight of itaconic acid, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid).

(12) Radical Curable Composition L

Radical curable composition L was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 60 parts by weight of 4-hydroxybutyl acrylate, 10 parts by weight of itaconic acid, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid).

(13) Radical Curable Composition M

Radical curable composition M was prepared by adding 3 parts by weight of a radical initiator phenylbis(2,4,6-trimethylbenzoyl)-phosphine oxide to 100 parts by weight of a radical curable composition including 70 parts by weight of 2-hydroxyethyl acrylate, 10 parts by weight of itaconic acid, and 20 parts by weight of 4-((1-(5-(3-(2-((2-carboxypropanoyl)oxy)-3-(methacryloyloxy)propoxy)-2-methylbenzyl)-3-(3-(2-((3-carboxypropanoyl)oxy)-3-(methacryloyloxypropoxy)-4-methylbenzyl)-2-methylphenoxy)-3-(methacryloyloxy)propane-2-yl)oxy)-4-oxobutanoic acid.

(14) Radical Curable Composition N

Radical curable composition N was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 70 parts by weight of 2-hydroxyethyl acrylate, 10 parts by weight of itaconic acid, and 20 parts by weight of 4-((1-(5-(3-(2-((2-carboxypropanoyl)oxy)-3-(methacryloyloxy)propoxy)-2-methylbenzyl)-3-(3-(2-((3-carboxypropanoyl)oxy)3-(methacryloyloxypropoxy)-4-methylbenzyl)-2-methylphenoxy)-3-(methacryloyloxy)propane-2-yl)oxy)-4-oxobutanoic acid.

(15) Radical Curable Composition O

Radical curable composition O was prepared by adding 3 parts by weight of a radical initiator phenylbis(2,4,6-trimethylbenzoyl)-phosphine oxide to 100 parts by weight of a radical curable composition including 70 parts by weight of 2-hydroxyethyl acrylate, 10 parts by weight of itaconic acid, and 20 parts by weight of 6,6-(((((propane-2,2-diylbis (4,1-phenylene))bis(oxy))bis(1-(acryloyloxy)propane-3,2-diyl)) bis(oxy))bis(carbonyl))bis(cyclohex-3-enecarboxylic acid).

(16) Radical Curable Composition P

Radical curable composition P was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 70 parts by weight of 2-hydroxyethyl acrylate, 10 parts by weight of itaconic acid, and 20 parts by weight of 6.6-((((propane-2,2-diylbis(4,1-phenylene))bis(oxy))bis(1-(methacryloyloxy)propane-3,2-diyl))bis(oxy))bis(carbonyl))bis(cyclohex-3-enecarboxylic acid).

(17) Radical Curable Composition Q

Radical curable composition Q was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 70 parts by weight of 2-hydroxyethyl acrylate and 30 parts by weight of 4,4'-((((propane-2,2-diylbis (4,1-phenylene))bis(oxy))bis(1-(methacryloyloxy)propane-3,2-diyl))bis(oxy))bis(4-oxobutanoic acid).

(18) Radical Curable Composition R

Radical curable composition R was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 50 parts by weight of 2-hydroxyethyl acrylate and 50 parts by weight of 4,4'-((((propane-2,2-diylbis (4,1-phenylene))bis(oxy))bis(1-(methacryloyloxy)propane-3,2-diyl))bis(oxy))bis(4-oxobutanoic acid).

(19) Radical Curable Composition S

Radical curable composition S was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 70 parts by weight of 2-hydroxyethyl acrylate, 10 parts by weight of maleic acid, and 20 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid).

(20) Radical Curable Composition T

Radical curable composition T was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 70 parts by weight of 2-hydroxyethyl acrylate, 10 parts by weight of isobornyl acrylate, and 20 parts by weight of 4,4'-((((propane-2,2-diylbis (4,1-phenylene))bis(oxy))bis(1-(methacryloyloxy) propane-3,2-diyl))bis(oxy))bis(4-oxobutanoic acid).

Specific structures of the compounds used in Radical Curable Compositions A to T are the same as those shown in the following [Table 1].

TABLE 1

| Name | Structure |
|---|---|
| 2-Hydroxyethyl acrylate | 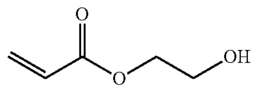 |
| 2-hydroxypropyl acrylate | 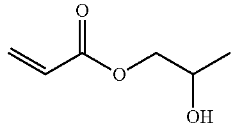 |
| 4-hydroxybutyl acrylate | 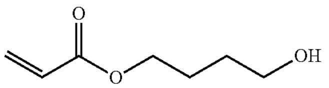 |
| Itaconic acid | 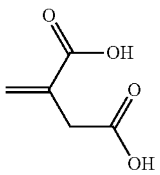 |
| 4-(carboxymethoxy)-2-methylene-4-oxobutanoic acid | 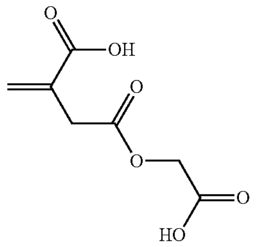 |
| 4-(2-(acryloyloxy)ethoxy)-2-methylene-4-oxobutanoic acid | 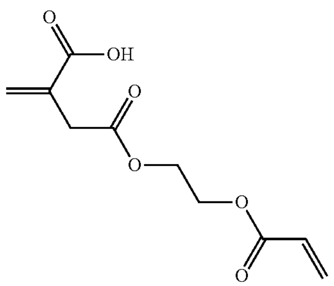 [SMILES: C=CC(=O)OCCOC(=O)CC(=C)C(=O)O] |

TABLE 1-continued

| Name | Structure |
|---|---|
| 4,4'-((((propane-2,2-diylbis(4,1-phenylene))bis(oxy))bis(1-(methacryloyloxy)propane-3,2-diyl))bis(oxy))bis(4-oxobutanoic acid) | 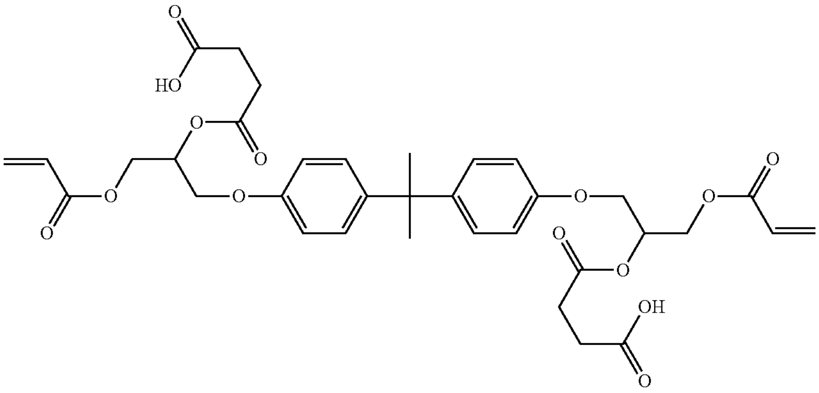 [SMILES: C=CC(=O)OCC(COc1ccc(C(C)(C)c2ccc(OCC(COC(=O)C=C)OC(=O)CCC(=O)O)cc2)cc1)OC(=O)CCC(=O)O] |
| 6,6-((((propane-2,2-diylbis(4,1-phenylene))bis(oxy))bis(1-(acryloyloxy)propane-3,2-diyl))bis(oxy))bis(carbonyl))bis(cyclohex-3-enecarboxylic acid) | 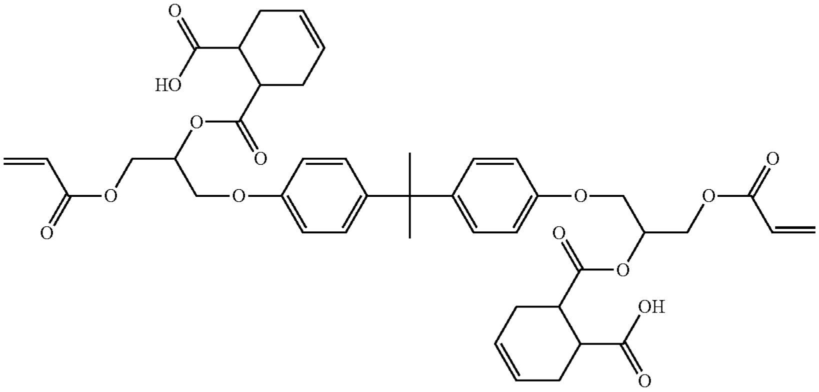 [SMILES: C=CC(=O)OCC(COc1ccc(C(C)(C)c2ccc(OCC(COC(=O)C=C)OC(=O)C3CC=CCC3C(=O)O)cc2)cc1)OC(=O)C1CC=CCC1C(=O)O] |
| 4-((1-(5-(3-(2-((2-carboxypropanoyl)oxy)-3-(methacryloyloxy)propoxy)-2-methylbenzyl)-3-(3-(2-((3-carboxypropanoyl)oxy)3-(methacryloyloxypropoxy)-4-methylbenzyl)-2-methylphenoxy)-3-(methacryloyloxy)propane-2-yl)oxy)-4-oxobutanoic acid | 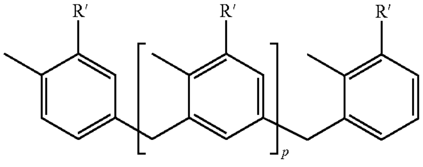<br>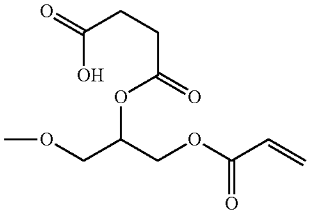<br>(Here, R' is<br>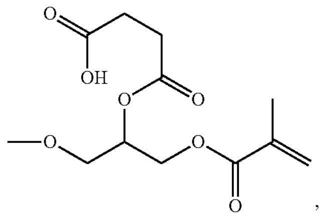<br>or , and p is an integer of 1 to 5) |
| Maleic acid | 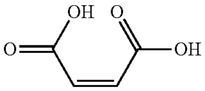 |

TABLE 1-continued

| Name | Structure |
| --- | --- |
| Isobornyl acrylate | 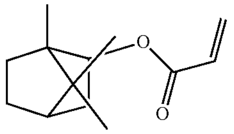 |

EXAMPLE 1

Radical curable composition A was applied on a primer layer of an acrylic film-based protective film prepared in Preparation Example 1 by using a dropper, and lamination was performed on one surface of a polarizer (PVA device), a condition was set such that the thickness of the final adhesive layer became 1 to 2 μm, and the film was allowed to pass through a laminator (5 m/min). Then, a polarizing plate including a protective film on one surface of a polarizer was manufactured by irradiating UV light with 900 $mJ/cm^2$ on a surface, on which the acrylic film was laminated, using a UV irradiation device (fusion lamp, D bulb).

Next, Radical curable composition A was applied on the other surface of the side on which the protective film of the polarizer (PVA device) of the polarizing plate manufactured above was laminated, a PET film having a release force was laminated, a condition was set such that the thickness of the final protective layer became 5 to 6 μm, and the film was allowed to pass through a laminator (5 m/min). Then, a polarizing plate including a protective film on one surface of a polarizer and a protective layer on the other surface thereof was manufactured by irradiating UV light with 900 $mJ/cm^2$ on a surface, on which a release PET film was laminated, using a UV irradiation device (fusion lamp, D bulb), and removing the PET film. The polarizing plate was manufactured under a constant temperature and constant humidity environment of a temperature of 20° C. and a humidity of 50%.

EXAMPLE 2

A polarizing plate was manufactured in the same manner as in Example 1, except that Radical Curable Composition B was used instead of Radical Curable Composition A.

EXAMPLE 3

A polarizing plate was manufactured in the same manner as in Example 1, except that Radical Curable Composition C was used instead of Radical Curable Composition A.

EXAMPLE 4

A polarizing plate was manufactured in the same manner as in Example 1, except that Radical Curable Composition D was used instead of Radical Curable Composition A.

EXAMPLE 5

A polarizing plate was manufactured in the same manner as in Example 1, except that Radical Curable Composition E was used instead of Radical Curable Composition A.

EXAMPLE 6

A polarizing plate was manufactured in the same manner as in Example 1, except that Radical Curable Composition F was used instead of Radical Curable Composition A.

EXAMPLE 7

A polarizing plate was manufactured in the same manner as in Example 1, except that Radical Curable Composition G was used instead of Radical Curable Composition A.

EXAMPLE 8

A polarizing plate was manufactured in the same manner as in Example 1, except that Radical Curable Composition H was used instead of Radical Curable Composition A.

EXAMPLE 9

A polarizing plate was manufactured in the same manner as in Example 1, except that Radical Curable Composition I was used instead of Radical Curable Composition A.

EXAMPLE 10

A polarizing plate was manufactured in the same manner as in Example 1, except that Radical Curable Composition J was used instead of Radical Curable Composition A.

EXAMPLE 11

A polarizing plate was manufactured in the same manner as in Example 1, except that Radical Curable Composition K was used instead of Radical Curable Composition A.

EXAMPLE 12

A polarizing plate was manufactured in the same manner as in Example 1, except that Radical Curable Composition L was used instead of Radical Curable Composition A.

EXAMPLE 13

A polarizing plate was manufactured in the same manner as in Example 1, except that Radical Curable Composition M was used instead of Radical Curable Composition A.

EXAMPLE 14

A polarizing plate was manufactured in the same manner as in Example 1, except that Radical Curable Composition N was used instead of Radical Curable Composition A.

EXAMPLE 15

A polarizing plate was manufactured in the same manner as in Example 1, except that Radical Curable Composition O was used instead of Radical Curable Composition A.

EXAMPLE 16

A polarizing plate was manufactured in the same manner as in Example 1, except that Radical Curable Composition P was used instead of Radical Curable Composition A.

COMPARATIVE EXAMPLE 1

A polarizing plate was manufactured in the same manner as in Example 1, except that Radical Curable Composition Q was used instead of Radical Curable Composition A.

COMPARATIVE EXAMPLE 2

A polarizing plate was manufactured in the same manner as in Example 1, except that Radical Curable Composition R was used instead of Radical Curable Composition A.

COMPARATIVE EXAMPLE 3

A polarizing plate was manufactured in the same manner as in Example 1, except that Radical Curable Composition S was used instead of Radical Curable Composition A.

COMPARATIVE EXAMPLE 4

A polarizing plate was manufactured in the same manner as in Example 1, except that Radical Curable Composition T was used instead of Radical Curable Composition A.

The following experiment was performed in order to measure the adhesion, thermal impact stability, glass transition temperature, curl characteristics and the like of the protective layers of the polarizing plates manufactured in Examples 1 to 16 and Comparative Examples 1 to 4. The results are shown in the following [Table 2].

1. Evaluation of adhesion: The radical curable compositions used in Examples 1 to 16 and Comparative Examples 1 to 4 were applied on a polarizer (PVA device), a polarizer (PVA device) was laminated thereon to allow the resulting film to pass through a laminator, UV light with 900 mJ/$cm^2$ was irradiated thereon by using a UV irradiation device (fusion lamp, D bulb) to manufacture a peel strength sample composed of the polarizer/the protective layer/the polarizer. The manufactured sample was left to stand under conditions of a temperature of 20° C. and a humidity of 70% for 4 days, cut into a width of 20 mm and a length of 100 mm, and then a peel strength was measured during the peeling-off at a speed of 300 mm/min and an angle of 90 degrees by using a Texture Analyzer apparatus (TA-XT manufactured by Stable Micro System Co.), and the cases in which the peel strength was more than 1 N/cm, 0.5 N/cm to 1.0 N/cm, and less than 0.5 N/cm indicated as excellent, good, and bad, respectively.

2. Evaluation of Thermal Impact Properties: The evaluation was performed by repeating a process of laminating the polarizing plates manufactured in Examples 1 to 16 and Comparative Examples 1 to 4 on a glass substrate, leaving the laminates to stand at −40° C. for 30 minutes, and then leaving the laminates to stand again at 80° C. for 30 minutes 100 times. Then, it was visually evaluated whether the external appearance of the polarizing plate changed. The cases, in which cracks with a size of 2 mm or less were generated only at the end portions, cracks with a short line shape of 5 mm or more were only confirmed at the portions other than the end portions, and a plurality of cracks was generated on the entire surface of the polarizing plate in the external appearance of the polarizing plate, were indicated as excellent, good, and bad, respectively.

3. Evaluation of Curl Characteristics: The polarizing plates manufactured in Examples 1 to 16 and Comparative Examples 1 to 4 were cut into a size of 100 mm×200 mm (transverse direction (TD)×machine direction (MD)), wound onto a 3-inch core, and then left to stand under a constant temperature and a constant humidity (20° C., 50%) overnight. Thereafter, the polarizing plates wound were unwound and placed onto the ground surface, the heights of the four surfaces elevated from the ground surface were measured, and then the average value thereof was calculated. The values of less than 10 mm and 10 mm or more were indicated as good and bad, respectively.

4. Measurement of Glass Transition Temperature: The protective layers of the polarizing plates manufactured under the aforementioned curing conditions in Examples 1 to 16 and Comparative Examples 1 to 4 were separated, and then the temperature was increased to −30 to 200° C. to measure the glass transition temperature at second run by using a differential scanning calorimeter (manufactured by DSC Mettler Inc.).

TABLE 2

| Classification | Composition | Thickness of protective layer [μm] | Tg (° C.) | Adhesion | Thermal impact stability | Curl |
|---|---|---|---|---|---|---|
| Example 1 | A | 5 | 78 | Excellent | Good | Good |
| Example 2 | B | 5 | 82 | Excellent | Excellent | Good |
| Example 3 | C | 5 | 110 | Good | Excellent | Good |
| Example 4 | D | 5 | 112 | Good | Excellent | Good |
| Example 5 | E | 5 | 83 | Excellent | Good | Good |
| Example 6 | F | 5 | 99 | Excellent | Excellent | Good |
| Example 7 | G | 5 | 103 | Excellent | Excellent | Good |
| Example 8 | H | 5 | 124 | Excellent | Excellent | Good |
| Example 9 | I | 5 | 85 | Good | Excellent | Good |
| Example 10 | J | 5 | 88 | Good | Excellent | Good |
| Example 11 | K | 5 | 60 | Good | Good | Good |
| Example 12 | L | 5 | 64 | Good | Good | Good |
| Example 13 | M | 5 | 65 | Good | Good | Good |
| Example 14 | N | 5 | 68 | Good | Good | Good |
| Example 15 | O | 5 | 74 | Excellent | Good | Good |
| Example 16 | P | 5 | 78 | Excellent | Good | Good |
| Comparative Example 1 | Q | 5 | 45 | Good | Bad | Good |
| Comparative Example 2 | R | 5 | 80 | Bad | Good | Good |
| Comparative Example 3 | S | 5 | 50 | Bad | Bad | Good |
| Comparative Example 4 | T | 5 | 46 | Bad | Bad | Good |

As shown in [Table 2], it can be seen that the polarizing plates manufactured by using Radical Curable Compositions A to P of the present invention in Examples 1 to 16 are excellent in adhesion even under a high humidity environment, and that the protective layers also have high glass transition temperature, and excellent heat resistance, such as excellent thermal impact stability.

However, as in Comparative Example 1, it can be seen that the polarizing plate manufactured by using Radical Curable Composition Q has good adhesion by adding the first compound in a large amount, but the glass transition temperature is low and heat resistance is not good, such as bad thermal impact stability.

Further, as in Comparative Example 2, it can be seen that for the polarizing plate manufactured by using Radical Curable Composition R, the glass transition temperature may be increased by adding the third compound in a large amount, and thermal impact stability is rather good, but adhesion is bad.

In addition, as in Comparative Example 3, it can be seen that the polarizing plate manufactured by using Radical Curable Composition S includes maleic acid which is similar to the second compound in the structure, but adhesion is bad, the glass transition temperature is also low, and thermal impact stability is also bad because maleic acid has low reactivity with respect to the curing of radicals.

Furthermore, as in Comparative Example 4, it can be seen that even though the polarizing plate manufactured by using Radical Curable Composition T includes isobornyl acrylate, adhesion is bad, the glass transition temperature is also low, and thermal impact stability is also bad because the polarizing plate does not include the second compound.

PREPARATION EXAMPLE 3—PREPARATION OF RADICAL CURABLE COMPOSITION (1) Radical Curable Composition U Radical curable composition U was prepared by adding 3 parts by weight of a radical initiator phenylbis(2,4,6-trimethylbenzoyl)-phosphine oxide to 100 parts by weight of a radical curable composition including 58 parts by weight of 2-hydroxyethyl acrylate, 8 parts by weight of itaconic acid, 17 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid), and 17 parts by weight of dimethylol tricyclodecane diacrylate.

(2) Radical Curable Composition V

Radical curable composition V was prepared by adding 3 parts by weight of a radical initiator phenylbis(2,4,6-trimethylbenzoyl)-phosphine oxide to 100 parts by weight of a radical curable composition including 68 parts by weight of 2-hydroxyethyl acrylate, 9 parts by weight of itaconic acid, 19 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid), and 4 parts by weight of 2-(methacryloyloxyethyl)phosphate.

(3) Radical Curable Composition W

Radical curable composition W was prepared by adding 3 parts by weight of a radical initiator phenylbis (2,4,6-trimethylbenzoyl)-phosphine oxide to 100 parts by weight of a radical curable composition including 56 parts by weight of 2-hydroxyethyl acrylate, 17 parts by weight of 4-(carboxymethoxy)-2-methylene-4-oxobutanoic acid, 10 parts by weight of 4-(2-(acryloyloxy)ethoxy)-2-methylene-4-oxobutanoic acid, and 17 parts by weight of diemthylol tricyclodecane diacrylate.

(4) Radical Curable Composition X

Radical curable composition X was prepared by adding 3 parts by weight of a radical initiator phenylbis(2,4,6-trimethylbenzoyl)-phospine oxide and 5 parts by weight of a photoacid generator diphenyl(4-phenylthio)phenylsulfonium hexafluorophosphate to 100 parts by weight of a radical curable composition including 66 parts by weight of 2-hydroxyethyl acrylate, 19 parts by weight of 4-(carboxymethoxy)-2-methylene-4-oxobutanoic acid, 11 parts by weight of 4-(2-(acryloyloxy)ethoxy)-2-methylene-4-oxobutanoic acid, and 4 parts by weight of 2-(methacryloyloxyethyl)phosphate.

(5) Radical Curable Composition Y

Radical curable composition Y was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 58 parts by weight of 2-hydroxyethyl acrylate, 8 parts by weight of itaconic acid, 17 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid), and 17 parts by weight of glycidyl methacrylate.

(6) Radical Curable Composition Z

Radical curable composition Z was prepared by adding 3 parts by weight of a radical initiator phenylbis(2,4,6-trimethylbenzoyl)-phosphine oxide and 5 parts by weight of a photoacid generator diphenyl(4-phenylthio)phenylsulfonium hexafluorophosphate to 100 parts by weight of a radical curable composition including 57 parts by weight of 2-hydroxyethyl acrylate, 17 parts by weight of 4-(carboxymethoxy)-2-methylene-4-oxobutanoic acid, 9 parts by weight of 4-(2-(acryloyloxy)ethoxy)-2-methylene-4-oxobutanoic acid, and 17 parts by weight of glycidyl methacrylate.

Specific structures of the compounds additionally used in Radical Curable Compositions U to Z are the same as those shown in the following [Table 3].

TABLE 3

| Name | Structure |
|---|---|
| Dimethylol tricyclodecane diacrylate | 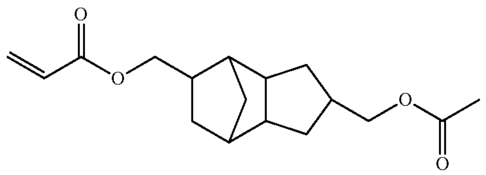 [SMILES: C=CC(=O)OCC1CC2CC1C1CC(COC(C)=O)CC21] |
| 2-(methacryloyloxy-ethyl)phosphate | 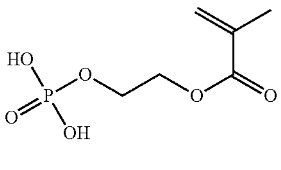 |

TABLE 3-continued

| Name | Structure |
|---|---|
| Glycidyl methacrylate | 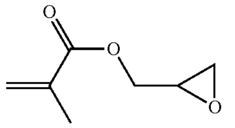 |

EXAMPLE 17

A polarizing plate was manufactured in the same manner as in Example 1, except that Radical Curable Composition U was used instead of Radical Curable Composition A.

EXAMPLE 18

A polarizing plate was manufactured in the same manner as in Example 1, except that Radical Curable Composition V was used instead of Radical Curable Composition A.

EXAMPLE 19

A polarizing plate was manufactured in the same manner as in Example 1, except that Radical Curable Composition W was used instead of Radical Curable Composition A.

EXAMPLE 20

A polarizing plate was manufactured in the same manner as in Example 1, except that Radical Curable Composition X was used instead of Radical Curable Composition A.

EXAMPLE 21

A polarizing plate was manufactured in the same manner as in Example 1, except that Radical Curable Composition Y was used instead of Radical Curable Composition A.

EXAMPLE 22

A polarizing plate was manufactured in the same manner as in Example 1, except that Radical Curable Composition Z was used instead of Radical Curable Composition A.

The water resistance, adhesion, glass transition temperature and thermal impact stability of each of the polarizing plates manufactured in Examples 17 to 22 were measured, and are shown in the following [Table 4]. The water resistance evaluation method is the same as the following method, and the others are the same as those as described above.

Evaluation of Water Resistance: The polarizing plates in Examples 17 to 22 were laminated on a glass substrate, and then immersed in a thermostat 60° C. The water resistance was judged by observing whether the end portions of the polarizing plate had been discolored after 8 hours, and the cases in which no change was observed and discoloration occurred were indicated as excellent and bad, respectively.

TABLE 4

| Classification | Composition | Water resistance | Tg (° C.) | Adhesion | Thermal impact stability |
|---|---|---|---|---|---|
| Example 17 | U | Excellent | 95 | Excellent | Excellent |
| Example 18 | V | Excellent | 96 | Excellent | Excellent |

TABLE 4-continued

| Classification | Composition | Water resistance | Tg (° C.) | Adhesion | Thermal impact stability |
|---|---|---|---|---|---|
| Example 19 | W | Excellent | 100 | Excellent | Excellent |
| Example 20 | X | Excellent | 101 | Excellent | Excellent |
| Example 21 | Y | Excellent | 100 | Good | Excellent |
| Example 22 | Z | Excellent | 105 | Good | Excellent |

As shown in Table 4, it can be seen that when the protective layer of the present invention further includes a polyfunctional (meth)acrylic compound and/or a phosphate-based compound, or an epoxy compound and a photoacid generator, the water resistance is also excellent.

Meanwhile, in the case of the Examples, the adhesive layer and the protective layer were manufactured by using the same radical curable composition for convenience during the manufacture of the polarizing plate, but the present invention is not limited thereto.

As described above, exemplary embodiments of the present invention have been described in detail, but it will be obvious to a person with ordinary skill in the art that the scope of the present invention is not limited thereto, and various modifications and changes may be made without departing from the technical spirit of the present invention described in the claims.

The invention claimed is:

1. A polarizing plate comprising:

a polarizer; and a protective layer formed on at least one surface of the polarizer, wherein the protective layer is a cured product of a radical curable composition comprising: (A) a first compound represented by the following [Formula I]; (B) a radical curable second compound represented by the following [Formula II]; (C) a radical initiator; and (D) a third compound having an acid value of 100 to 1,000 mg KOH/g:

[Formula I]

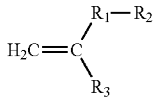

wherein $R_1$ is an ester group or an ether group; $R_2$ is a $C_{1\sim10}$ alkyl group, a $C_{4\sim10}$ cycloalkyl group, or a combination thereof, and in this case, $R_2$ has at least one hydroxy substituent in a molecule thereof; and $R_3$ is hydrogen, or a substituted or unsubstituted $C_{1\sim10}$ alkyl group,

[Formula II]

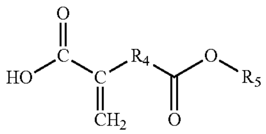

wherein $R_4$ is a single bond, a substituted or unsubstituted $C_{1\sim10}$ alkylene group, a substituted or unsubstituted $C_{4\sim14}$ cycloalkylene group, a substituted or unsubstituted $C_{6\sim14}$ arylene group, or a combination thereof; and $R_5$ is hydrogen; or a substituted or unsubstituted $C_{1\sim10}$ alkyl group, a substituted or unsubstituted $C_{4\sim14}$ cycloalkyl group, a substituted or unsubstituted $C_{6\sim14}$ aryl group, or a combination thereof.

2. The polarizing plate of claim 1, wherein the radical curable composition comprises 40 to 90 parts by weight of the first compound, 1 to 50 parts by weight of the second compound and 0.5 to 10 parts by weight of the radical initiator, based on 100 parts by weight of the radical curable composition.

3. The polarizing plate of claim 1, wherein the first compound is one or more selected from the group consisting of compounds represented by the following [Formula 1] to [Formula 8]:

[Formula 1]

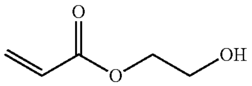

[Formula 2]

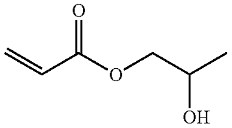

[Formula 3]

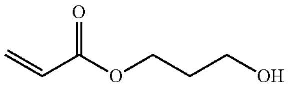

[Formula 4]

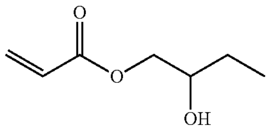

[Formula 5]

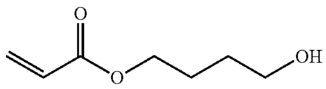

[Formula 6]

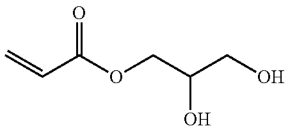

[Formula 7]

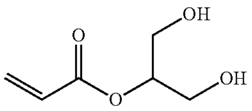

-continued

[Formula 8]

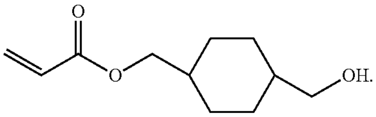

4. The polarizing plate of claim 1, wherein the second compound is one or more selected from the group consisting of compounds represented by the following [Formula 9] to [Formula 13]:

[Formula 9]

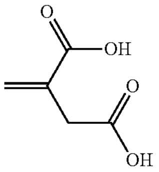

[Formula 10]

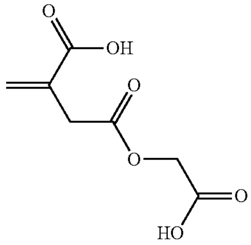

[Formula 11]

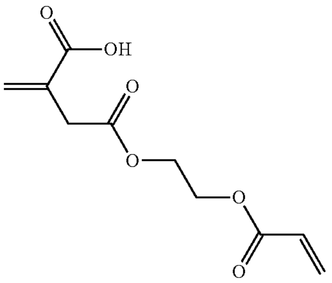

[Formula 12]

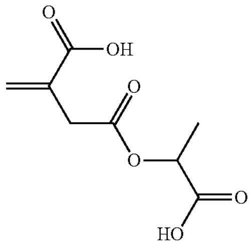

[Formula 13]

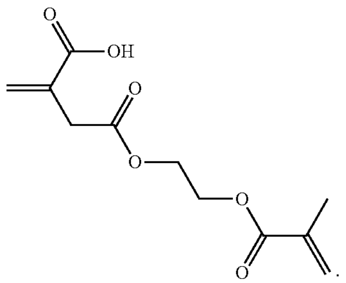

5. The polarizing plate of claim 1, wherein the third compound is one or more selected from the group consisting of compounds represented by the following [Formula 14] to [Formula 25]:

[Formula 14]
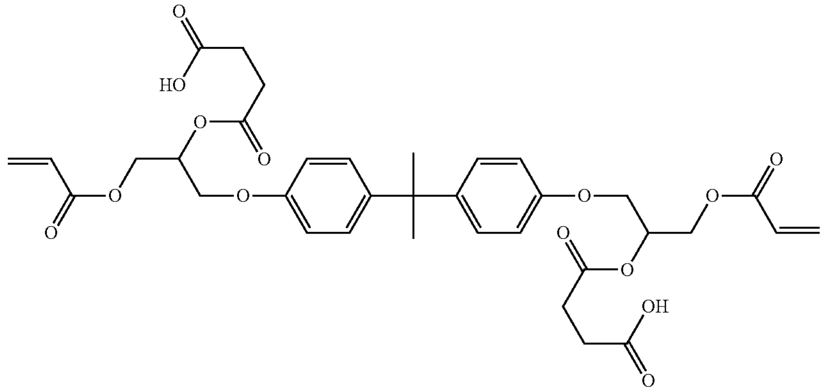
[Formula 15]
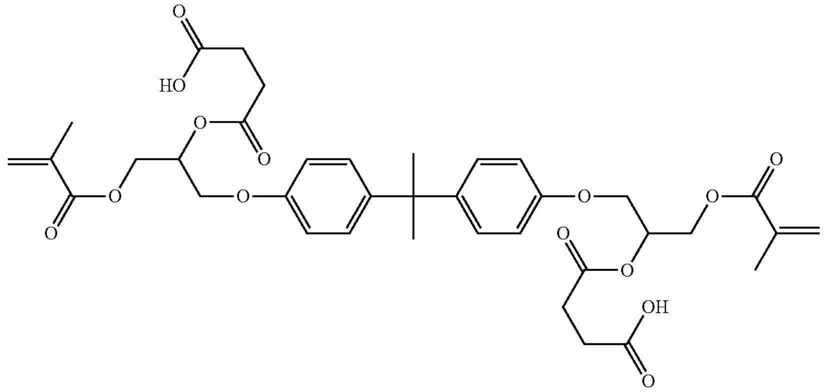
[Formula 16]
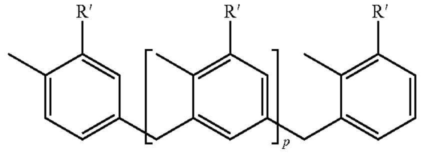
(wherein R' is
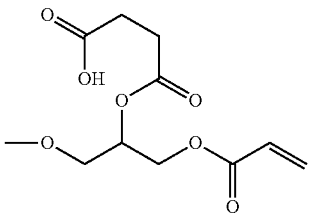
or
-continued
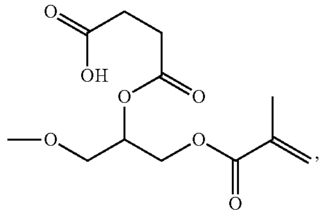
,
and p is an integer of 1 to 5)
[Formula 17]
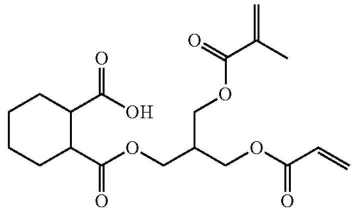
[Formula 18]
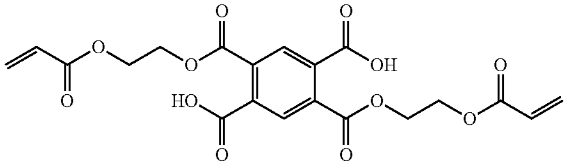

-continued

[Formula 19]

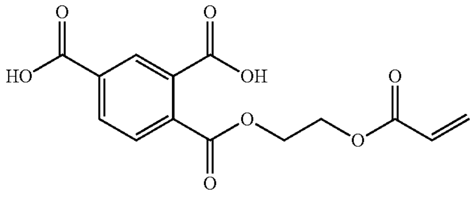

[Formula 20]

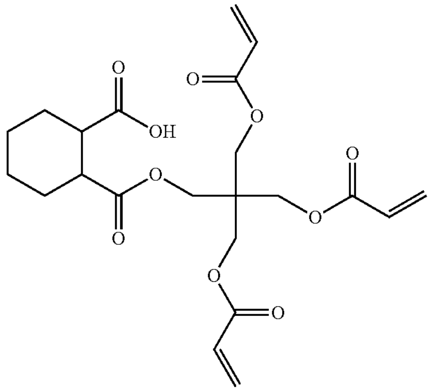

[Formula 21]

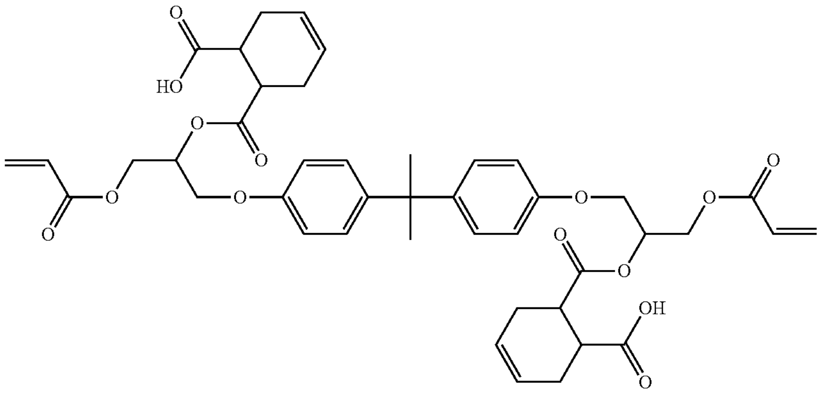

[Formula 22]

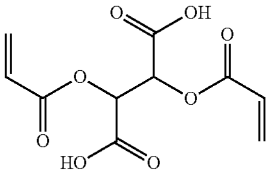

[Formula 23]

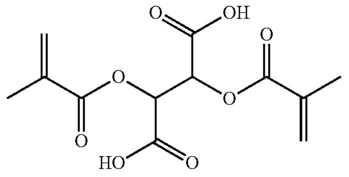

[Formula 24]

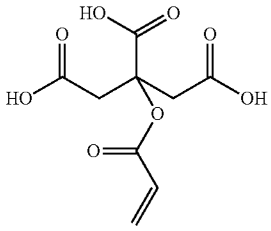

[Formula 25]

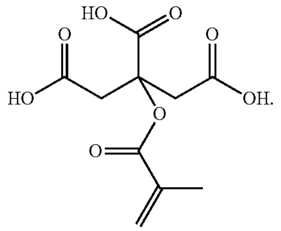

6. The polarizing plate of claim 1, wherein a content of the third compound is 1 to 50 parts by weight based on 100 parts by weight of the radical curable composition.

7. The polarizing plate of claim 1, wherein the radical curable composition further comprises a photoacid generator.

8. The polarizing plate of claim 1, wherein the radical curable composition further comprises a polyfunctional (meth)acrylic compound, a phosphate-based compound comprising at least one (meth)acrylic group in a molecule thereof, or a combination thereof.

9. The polarizing plate of claim 1, wherein the radical curable composition further comprises an epoxy compound comprising at least one epoxy group in a molecule thereof, and a photoacid generator.

10. The polarizing plate of claim 1, wherein the radical curable composition after the curing has a glass transition temperature of 60° C. or more.

11. The polarizing plate of claim 1, wherein a thickness of the protective layer is 0.5 to 20 μm.

12. The polarizing plate of claim 1, wherein a protective film is attached, through an adhesive layer, to a surface opposite to a surface of the polarizer, on which the protective layer is formed previously.

13. The polarizing plate of claim 1, further comprising an adhesion layer at an upper portion of the protective layer.

14. An image display device comprising the polarizing plate of claim 1.

* * * * *